(12) United States Patent
Gary et al.

(10) Patent No.: US 7,080,267 B2
(45) Date of Patent: Jul. 18, 2006

(54) METHODOLOGY FOR MANAGING POWER CONSUMPTION IN AN APPLICATION

(75) Inventors: Scott P. Gary, Santa Barbara, CA (US); Robert J. Cyran, Delmont, PA (US); Vijaya B. P. Sarathy, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 451 days.

(21) Appl. No.: 10/461,025

(22) Filed: Jun. 13, 2003

(65) Prior Publication Data

US 2004/0025067 A1    Feb. 5, 2004

Related U.S. Application Data

(60) Provisional application No. 60/400,426, filed on Aug. 1, 2002.

(51) Int. Cl.
*G06F 1/26* (2006.01)
*G06F 1/32* (2006.01)
*G06F 13/00* (2006.01)

(52) U.S. Cl. .................. 713/300; 713/320; 719/318
(58) Field of Classification Search ............. 713/300, 713/320; 709/224, 203; 719/318
See application file for complete search history.

(56) References Cited

U.S. PATENT DOCUMENTS

| | | | | |
|---|---|---|---|---|
| 5,201,059 A * | 4/1993 | Nguyen | ............. | 713/323 |
| 5,410,711 A * | 4/1995 | Stewart | ............. | 713/322 |
| 5,414,860 A * | 5/1995 | Canova et al. | ........... | 713/340 |
| 5,560,022 A * | 9/1996 | Dunstan et al. | ........... | 713/300 |
| 5,745,774 A * | 4/1998 | Munetsugu | ............ | 713/322 |
| 5,760,636 A * | 6/1998 | Noble et al. | ............. | 327/513 |
| 5,812,860 A * | 9/1998 | Horden et al. | ............ | 713/322 |
| 6,131,166 A * | 10/2000 | Wong-Insley | ............. | 713/300 |
| 6,484,041 B1 * | 11/2002 | Aho et al. | ................. | 455/574 |
| 6,519,707 B1 * | 2/2003 | Clark et al. | ............... | 713/322 |
| 2002/0083355 A1 | 6/2002 | Clark et al. | | |
| 2002/0188877 A1 | 12/2002 | Buch | | |

OTHER PUBLICATIONS

Run-time voltage hopping for low-power real-time systems, by Seongsoo Lee and Takayasu Sakural, DAC 2000, ACM 1-58113-187-9.*

(Continued)

*Primary Examiner*—Thomas Lee
*Assistant Examiner*—Suresh K Suryawanshi
(74) *Attorney, Agent, or Firm*—Robert D. Marshall, Jr.; W. James Brady, III; Frederick J. Telecky, Jr.

(57) ABSTRACT

Methods and systems are provided for dynamically managing power consumption in a digital system. These methods and systems broadly provide for permitting clients executing on a digital system to register for notification of power event and to request that power events occur. Registered clients are notified when a power event is requested and the requested power event is caused to occur. Power events are selected from a group comprising setpoint change, enter deep sleep mode, enter snooze mode, and change to power supply status. There may also be user-defined custom power events. If the requested power event is a setpoint change, a check is made to verify that each of the registered clients can operate at the requested setpoint. The digital system may be comprised of processor with a single processing core with a single clock or a processor with multiple processing cores and multiple clocks.

29 Claims, 5 Drawing Sheets

OTHER PUBLICATIONS

Run-time power control scheme using software feedback loop for low-power real-time applications, by Seongsoo Lee and Takayasu Sakurai, 2000 IEEE, 0-7803-5973-9.*

Intra-task voltage scheduling for low-energy hard real-time applications, by Dongkun Shin and Seongsoo Lee, IEEE Design & Test of Computers, 0740-7450.*

Jiong Luo, et al.; *Battery-Aware Static Scheduling for Distributed Real-Time Embedded System*, Dept. of Electrical Eng., Princeton Univ., Princeton, NJ, DAC 2001, Jun. 18-22, 1002, Las Vegas, NV, US, 2001 ACM 1-58113-297-2/01/0006; 6 pgs.

Seongsoo Lee, et al.; *Run-Time Power Control Scheme Using Software Feedback Loop for Low-Power Real-Time Applications*, Ctr. For Collaborative Research and Institute of Industrial Science, Univ. of Tokyo, 2000 IEEE ISBN 0-7803-5974-7, pp. 381-386.

Luca Benini, et al.; *System-Level Power Optimization: Techniques and Tools*, ISLPED99, San Diego, CA, USA, 1999 ACM 1-58113-133-X/99/0008, pp. 288-293.

Seongsoo Lee, et al.; *Run-Time Voltage Hopping for Low-Power Real-Time Systems*, Ctr. For Collaborative Research and Institute of Industrial Science, Univ. of Tokyo, 2000 ACM 1-58113-188-7/00/00006; pp. 806-809.

Tom Halfhill, *Intel Spills the Beans About Banias—New Mobile CPU and Chip Set Have Numerous Power-Saving Features*, Microprocessor, Special Expanded Issue Covering Microprocessor Forum 2002, vol. 16, Archive 11, Nov. 2002, pp. 4-10.

Gang Quan, et al.; *Energy Efficient Fixed-Priority Scheduling for Real-Time Systems on Variable Voltage Processors*, Dept. of Computer Science and Eng., Univ. of Notre Dame, Notre Dame, IN, USA, DAC 2001, Jun. 18-22, 1002, Las Vegas, NV, US, 2001 ACM 1-58113-297-2/01/0006; 6 pgs.

Texas Instruments Incorporated, *Application Report: Analyzing Target System Energy Consumption in Code Composer Studio™ IDE*, Software Development Systems, pp. 1-12A.

Dongkun Shin, et al.; *Intra-Task Voltage Scheduling for Low-Energy Hard Real-Time Applications*, IEEE Design & Test of Computers, Voltage Scheduling for Applications, Mar.-Apr. 2001, 0740-7475/01, 2001 IEEE, pp. 20-30.

Texas Instruments Incorporated, *SCAA035B*, June 1997: *CMOS Power Consumption and $C_{pd}$ Calculation*, Software Development Systems, 16 pgs.

Amit Sinha, et al.; *Energy Efficient Real-Time Scheduling*, Mass. Inst. Of Technology, Presentation, 19 pgs.

Intel, *Intel® PCA Power Management, Software Design Guide*, Sep. 4, 2002, Rev. 1.0, Doc. No. 251797, 72 pgs.

Texas Instruments Incorporated, *Application Report: Calculation of TMS320LC54x Power Dissipation*, Digital Signal Processing Solutions, 1997, 62 pgs.

* cited by examiner

METHODOLOGY FOR MANAGING POWER CONSUMPTION IN AN APPLICATION

This application claims priority to provisional application Ser. No. 60/400,426 filed Aug. 1, 2002. This application is related to copending applications Ser. No. 10/461,289 entitled Methodology for Coordinating and Tuning Application Power filed Jun. 13, 2003 and Ser. No. 10/461,947 entitled Methods and Systems for Performing Dynamic Power Management Via Frequency and Voltage Scaling filed Jun. 13, 2003.

FIELD OF THE INVENTION

This invention generally relates to software development systems, and more specifically to improvements in software support for power management in systems and applications.

BACKGROUND OF THE INVENTION

Power efficiency is a key requirement across a broad range of systems, ranging from small portable devices, to rack-mounted processor farms. Even in systems where high performance is key, power efficiency is still a care-about. Power efficiency is determined both by hardware design and component choice, and software-based runtime power management techniques.

In wired systems power efficiency will typically enable a reduction in power supply capacity, as well as a reduction in cooling requirements and fan noise, and ultimately product cost. Power efficiency can allow an increase in component density as well. For example, a designer may be limited by the number of processors that can be placed on a board simply because the cumulative power consumption would exceed compliance limits for the bus specification. Increased component density can result either in increased capacity, a reduction in product size, or both.

In mobile devices, power efficiency means increased battery life, and a longer time between recharge. It also enables selection of smaller batteries, possibly a different battery technology, and a corresponding reduction in product size.

Power efficiency is a key product differentiator. A simple example is a buyer shopping for an MP3 player at an electronics store. In a side-by-side comparison of two players with the same features, the decision will likely go to the player with the longest time between recharge. In many scenarios, the success or failure of a product in its marketplace will be determined by its power efficiency.

The total power consumption of a CMOS circuit is the sum of both active and static power consumption: $P_{total}=P_{active}+P_{static}$. Active power consumption occurs when the circuit is active, switching from one logic state to another. Active power consumption is caused both by switching current (that needed to charge internal nodes), and through current (that which flows when both P and N-channel transistors are both momentarily on). Active power consumption can be approximated by the equation: $P_{transient}=C_{pd} \times F \times V_{cc}^2 \times N_{sw}$, where $C_{pd}$ is the dynamic capacitance, F is the switching frequency, $V_{cc}$ is the supply voltage, and $N_{sw}$ is the number of bits switching. An additional relationship is that voltage ($V_{cc}$) determines the maximum switching frequency (F) for stable operation. The important concepts here are: 1) the active power consumption is linearly related to switching frequency, and quadratically related to the supply voltage, and 2) the maximum switching frequency is determined by the supply voltage.

If an application can reduce the CPU clock rate and still meet its processing requirements, it can have a proportional savings in power dissipation. Due to the quadratic relationship, if the frequency can be reduced safely, and this frequency is compatible with a lower operating voltage available on the platform, then in addition to the savings due to the reduced clock frequency, a potentially significant additional savings can occur by reducing the voltage. However, it is important to recognize that for a given task set, reducing the CPU clock rate also proportionally extends the execution time of the same task set, requiring careful analysis of the application ensure that it still meets its real-time requirements. The potential savings provided by dynamic voltage and frequency scaling (DVFS) has been extensively studied in academic literature, with emphasis on ways to reduce the scaling latencies, improve the voltage scaling range, and schedule tasks so that real-time deadlines can still be met. For example, see *Run-time Power Control Scheme Using Software Feedback Loop for Low-Power Real-time Applications*, IEEE ISBN 0-7803-5974-7, Seongsoo Lee, Takayasu Sakurai, 2000; *Intra-Task Voltage Scheduling for Low-Energy Hard Real-Time Applications*, IEEE Design & Test of Computers, Dongkun Shin, Jihong Kim, Seongsoo Lee, 2001; and *Run-time Voltage Hopping for Low-power Real-time Systems*, DAC2000, ACM 1-58113-188-7, Seongsoo Lee, Takayasu Sakurai 2000.

Static power consumption is one component of the total power consumption equation. Static power consumption occurs even when the circuit is not switching, due to reverse-bias leakage. Traditionally, the static power consumption of a CMOS circuit has been very small in comparison to the active power consumption. Embedded applications will typically idle the CPU clock during inactivity to eliminate active power, which dramatically reduces total power consumption. However, new higher-performance transistors are bringing significant boosts in leakage currents, which requires new attention to the static power consumption component of the total power equation.

There are many known techniques utilized both in hardware design and at run-time to help reduce power dissipation. Table 1 lists some up-front hardware design decisions for reducing power dissipation. Table 2 lists common techniques employed at run-time to reduce power dissipation. Table 3 lists some fundamental challenges to utilizing these power management techniques in real-time systems.

TABLE 1

| Decision | Description |
| --- | --- |
| Choose a low-power technology base | Choosing a power-efficient process (e.g., CMOS) is perhaps the most important up-front decision, and directly drives power efficiency. |
| Partition separate voltage and clock domains | By partitioning separate domains, different components can be wired to the appropriate power rail and clock line, eliminating the need for all circuitry to operate at the maximum required by any specific module. |
| Enable scaling of voltage and frequency | Designing in programmable clock generators allows application code a linear savings in power when it can scale down the clock frequency. A programmable voltage source allows the potential for an additional quadratic power savings when the voltage can be reduced as well, because of reduced frequency. Also, designing the hardware to minimize scaling latencies will enable broader usage of the scaling technique. |
| Enable gating of different voltages to modules | Some static RAMs require less voltage in retention mode vs. normal operation mode. By designing in voltage gating circuitry, power consumption can be reduced during inactivity while still retaining state. |

TABLE 1-continued

| Decision | Description |
|---|---|
| Utilize interrupts to alleviate polling by software | Often software is required to poll an interface periodically to detect events. For example, a keypad interface routine might need to spin or periodically wake to detect and resolve a keypad input. Designing the interface to generate an interrupt on keypad input will not only simplify the software, but it will also enable event-driven processing and activation of processor idle and sleep modes while waiting for interrupts. |
| Reduce loading of outputs | Decreasing capacitive and DC loading on output pins will reduce total power consumption. |
| Use hierarchical memory model | Depending on the application, utilizing cache and instruction buffers can drastically reduce off-chip memory accesses and subsequent power draw. |
| Boot with resources un-powered | Many systems boot in a fully active state, meaning full power consumption. If certain subsystems can be left un-powered on boot, and later turned on when really needed, it eliminates unnecessary wasted power. |
| Minimize number of active phase lock loops (PLL) | Using shared clocks can reduce the number of active clock generators, and their corresponding power draw. For example, a processor's on-board PLL can be bypassed in favor of an external clock signal. |
| Use clock dividers for fast selection of an alternate frequency | A common barrier to highly dynamic frequency scaling is the latency of re-locking a PLL on a frequency change. Adding a clock divider circuit at the output of the PLL will allow instantaneous selection of a different clock frequency. |

TABLE 2

| Technique | Description |
|---|---|
| Gate clocks off when not needed | As described above, active power dissipation in a CMOS circuit occurs only when the circuit is clocked. By turning off clocks that are not needed, unnecessary active power consumption is eliminated. Most processors incorporate a mechanism to temporarily suspend active power consumption in the CPU while waiting for an external event. This idling of the CPU clock is typically triggered via a 'halt' or 'idle' instruction, called during application or OS idle time. Some processors partition multiple clock domains, which can be individually idled to suspend active power consumption in unused modules. For example, in the Texas Instruments TMS320C5510 DSP, six separate clock domains, CPU, cache, DMA, peripheral clocks, clock generator, and external memory interface, can be selectively idled. |
| Activate peripheral low-power modes | Some peripherals have built-in low power modes that can be activated when the peripheral is not immediately needed. For example, a device driver managing a codec over a serial port can command the codec to a low power mode when there is no audio to be played, or if the whole system is being transitioned to a low-power mode. |
| Leverage peripheral activity detectors | Some peripherals have built-in activity detectors that can be programmed to power down the peripheral after a period of inactivity. For example, a disk drive can be automatically spun down when the drive is not being accessed, and spun back up when needed again. |
| Utilize auto-refresh modes | Dynamic memories and displays will typically have a self or auto-refresh mode where the device will efficiently manage the refresh operation on its own. |
| On boot actively turn off unnecessary power consumers | Processors typically boot up fully powered, at a maximum clock rate, ready to do work. There will inevitably be resources powered that are not needed yet, or that may never be used in the course of the application. At boot time, the application or OS may traverse the system, turning off/idling unnecessary power consumers. |

TABLE 2-continued

| Technique | Description |
|---|---|
| Gate power to subsystems only as needed | A system may include a power-hungry module that need not be powered at all times. For example, a mobile device may have a radio subsystem that only needs to be ON when in range of the device with which it communicates. By gating power OFF/ON on demand, unnecessary power dissipation can be avoided. |
| Benchmark application to find minimum required frequency and voltages | Typically, systems are designed with excess processing capacity built in, either for safety purposes, or for future extensibility and upgrades. For the latter case, a common development technique is to fully exercise and benchmark the application to determine excess capacity, and then 'dial-down' the operating frequency and voltage to that which enables the application to fully meet its requirements, but minimizes excess capacity. Frequency and voltage are usually not changed at runtime, but are set at boot time, based upon the benchmarking activity. |
| Adjust CPU frequency and voltage based upon gross activity | Another technique for addressing excess processing capacity is to periodically sample CPU utilization at runtime, and then dynamically adjust the frequency and voltage based upon the empirical utilization of the processor. This "interval-based scheduling" technique improves on the power-savings of the previous static benchmarking technique because it takes advantage of the dynamic variability of the application's processing needs. |
| Dynamically schedule CPU frequency and voltage to match predicted work load | The "interval-based scheduling" technique enables dynamic adjustments to processing capacity based upon history data, but typically does not do well at anticipating the future needs of the application, and is therefore not acceptable for systems with hard real-time deadlines. An alternate technique is to dynamically vary the CPU frequency and voltage based upon predicted workload. Using dynamic, fine-grained comparison of work completed vs. the worst-case execution time (WCET) and deadline of the next task, the CPU frequency and voltage can be dynamically tuned to the minimum required. This technique is most applicable to specialized systems with data-dependent processing requirements that can be accurately characterized. Inability to fully characterize an application usually limits the general applicability of this technique. Study of efficient and stable scheduling algorithms in the presence of dynamic frequency and voltage scaling is a topic of much on-going research. |
| Optimize execution speed of code | Developers often optimize their code for execution speed. However, in many situations the speed may be good enough, and further optimizations are not considered. When considering power consumption, faster code will typically mean more time for leveraging idle or sleep modes, or a greater reduction in the CPU frequency requirements. In some situations, speed optimizations may actually increase power consumption (e.g., more parallelism and subsequent circuit activity), but in others, there may be power savings. |
| Use low-power code sequences and data patterns | Different processor instructions exercise different functional units and data paths, resulting in different power requirements. Additionally, because of data bus line capacitances and the inter-signal capacitances between bus lines, the amount of power required is affected by the data patterns that are transferred over the data buses. And, the power requirements are affected by the signaling patterns chosen (1s vs. 0s) for external interfaces (e.g., serial ports). Analyzing the affects of individual instructions and data patterns is an extreme technique that is sometimes used to maximize power efficiency. |
| Scale application and OS footprint based upon minimal requirements | Architecting application and OS code bases to be scalable can reduce memory requirements and, therefore, the subsequent runtime power requirements. For example, by simply placing individual functions or APIs into individual linkable objects, |

TABLE 2-continued

| Technique | Description |
|---|---|
| | the linker can link in only the code/data needed and avoid linking dead code/data. |
| Use code overlays to reduce fast memory requirements | For some applications, dynamically overlaying code from non-volatile to fast memory will reduce both the cost and power consumption of additional fast memory. |
| Tradeoff accuracy vs. power consumption | Accepting less accuracy in some calculations can drastically reduce processing requirements. For example, certain signal processing applications can tolerate more noise in the results, which enables reduced processing and reduced power consumption. |
| Enter a reduced capability mode on a power change | When there is a change in the capabilities of the power source, e.g., when going from AC to battery power, a common technique is to enter a reduced capability mode with more aggressive runtime power management. A typical example is a laptop computer, where the OS is notified on a switch to battery power, and activates a different power management policy, with a lower CPU clock rate, a shorter timeout before the screen blanks or the disk spins down, etc. The OS power policy implements a tradeoff between responsiveness and extending battery life. A similar technique can be employed in battery-only systems, where a battery monitor detects reduced capacity, and activates more aggressive power management, such as slowing down the CPU, not enabling image viewing on the digital camera's LCD display, etc. |

TABLE 3

| Challenge | Description |
|---|---|
| Scaling CPU frequency with workload often affects peripherals | For many processors the same clock that feeds the CPU also feeds on-chip peripherals, so scaling the clock based upon CPU workload can have side-affects on peripheral operation. The peripherals may need to be reprogrammed before and/or after the scaling operation, and this may be difficult if a pre-existing (non power-aware) device driver is being used to manage the peripheral. Additionally, if the scaling operation affects the timer generating the OS system tick, this timer will need to be adapted to follow the scaling operation, which will affect the absolute accuracy of the time base. |
| V/F scaling latencies can be large, and platform-dependent | The latency for voltage and frequency scaling operations will vary widely across platforms. An application that runs fine on one platform may not be portable to another platform, and may not run on a revision to the same platform if the latencies change much. For example, the time for a down-voltage scaling operation is typically load-dependent, and if the load changes significantly on the revised platform the application may not run correctly. |
| Might not have stable operation during V/F scaling | Some processor vendors specify a non-operation sequence during voltage or clock frequency changes to avoid instabilities during the transition. In these situations, the scaling code will need to wait for the transition to occur before returning, increasing the scaling latency. |
| V/F scaling directly affects ability to meet deadlines | Changing CPU frequency (and voltage when possible) will alter the execution time of a given task, potentially causing the task to miss a real-time deadline. Even if the new frequency is compatible with the deadline, there may still be a problem if the latency to switch between V/F setpoints is too big. |
| Scaling the CPU clock can affect ability to measure CPU utilization | If the clock that feeds the CPU also feeds the OS timer, the OS timer will be scaled along with the CPU, which compromises measurement of CPU utilization. |
| Watchdogs still need to be kept happy | Watchdog timers are used to detect abnormal program behavior and either shutdown or reboot a system. Typically the watchdog needs to be serviced within a pre-defined time interval to keep it from |

TABLE 3-continued

| Challenge | Description |
|---|---|
| | triggering. Power management techniques that slow down or suspend processing can therefore inadvertently trigger application failure. |
| Idle and sleep modes typically collide with emulation, debug, and instrumentation | Depending upon the processor and the debug tools, invoking idle and sleep modes can disrupt the transport of real-time instrumentation and debugging information from the target. In the worst case it may perturb and even crash the debug environment. Similar concerns arise with V/F scaling, which may cause difficulty for the emulation and debug circuitry. It may be the case that power management is enabled when the system is deployed, but only minimally used during development. |
| Context save/restore can become non-trivial | In a non-power managed environment the OS or application framework will typically save and restore register values during a context switch. As register banks, memories, and other modules are powered OFF and back ON, the context to be saved and restored can grow dramatically. Also, if a module is powered down it may be difficult (and sometimes not possible) to fully restore the internal state of the module. |
| Most advanced power management techniques are still in the research stage | Many of the research papers that demonstrate significant power savings use highly specialized application examples, and do not map well to general application cases. Or, they make assumptions regarding the ability to fully characterize an application such that it can be guaranteed to be schedulable. These techniques often do not map to 'real world', multi-function programmable systems, and more research is needed for broader applicability. |
| Different types of applications call for different techniques | Different hardware platforms have varying levels of support for the above listed techniques. Also, different applications running on the same platform may have different processing requirements. For some applications, only the low-latency techniques (e.g., clock idling) are applicable, but for others the higher-latency techniques can be used to provide significant power savings when the application switches between modes with significantly different processing requirements. For example, one mode can be run at low V/F, and another mode, with higher processing requirements, can be run at a higher V/F. If the V/F latency is compatible with the mode switch time, the application can use the technique. |

SUMMARY OF THE INVENTION

The present invention provides methods and systems for dynamically managing power consumption in a digital system. Embodiments of the invention permit clients executing on the digital system to register for notification of power event and to request that power events occur. Registered clients are notified when a power event is requested and the requested power event is caused to occur. A client may unregister for notification of power events when notification is no longer desired. Power events are selected from a group comprising setpoint change, enter deep sleep mode, enter snooze mode, and change to power supply status. There may also be user-defined custom power events. If the requested power event is a setpoint change, a check is made to verify that each of the registered clients can operate at the requested setpoint. If a registered client cannot operate at the requested setpoint, the setpoint of the digital system is not changed.

Digital systems are provided in which power consumption is dynamically managed during the operation of systems. Embodiments of such systems comprise a processor, one or more peripheral devices, an operating system, an application, and a power management module incorporated in the digital system as an adjunct to the operating system and the application wherein the power management module provided power management functionality for the digital system. The processor of the digital system may be comprised of a single processing core with a single clock or of multiple processing cores and multiple clocks. The power management module is operable to provide one or more of the methods for dynamic power management described above. The power management module may provide at least any combination of the following functionality: causing a power-saving function to be called when the digital system is booted, invoking application specific sleep modes, registering of clients for notification of one or more power events and notifying the registered clients of power events for which the registered clients requested notification, idling one or more specified clock domains and changing a setpoint of the processor during operation of the digital system.

BRIEF DESCRIPTION OF THE DRAWINGS

Particular embodiments in accordance with the invention will now be described, by way of example only, and with reference to the accompanying drawings.

Corresponding numerals and symbols in the different figures and tables refer to corresponding parts unless otherwise indicated.

DETAILED DESCRIPTION OF EMBODIMENTS OF THE INVENTION

The present invention provides systems and methods to permit application developers to select and utilize power management techniques that are compatible with specific application requirements. Although these systems and methods are described below in relation to a real-time operating system (RTOS), they may be easily adapted by one skilled in the art to other operating systems or application environments without an operating system.

Figure 1:
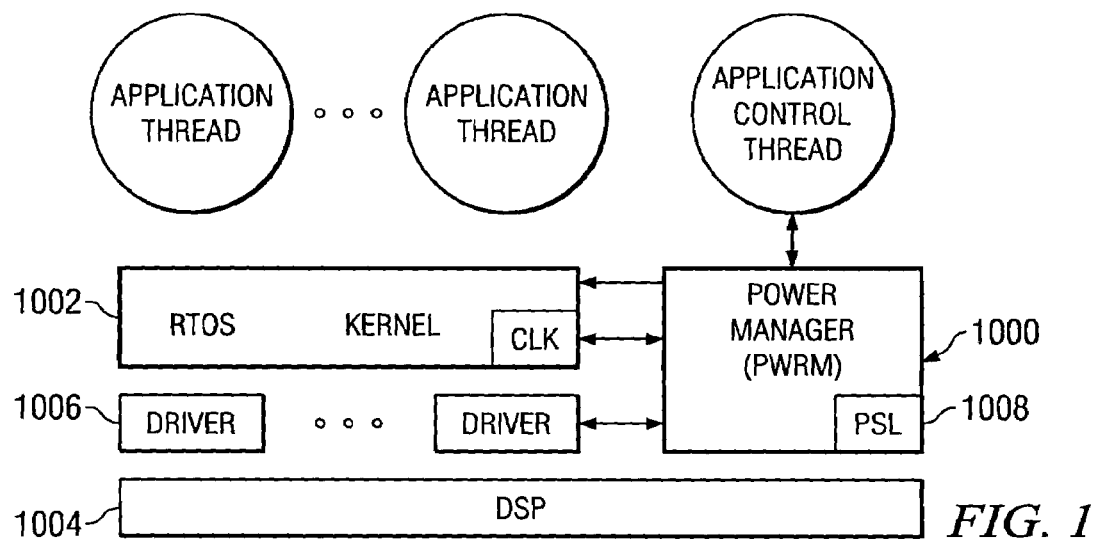
FIG. 1 presents a logical architecture of an embodiment of a system that permits applications to utilize power management techniques compatible with application requirements.

FIG. 1 presents a logical architecture of an embodiment of a system that permits applications to utilize power management techniques compatible with application requirements. Power management module (PWRM) 1000 is added to an application comprising real-time operating system (RTOS) 1002, processor 1004, and various device drivers 1006. Conceptually, PWRM 1000 is an adjunct to RTOS 1002. PWRM 1000 does not operate as another task in RTOS 1002. Instead, PWRM 1000 provides a set of application program interfaces (APIs) that execute in the context of application control threads and device drivers.

The capabilities of real-time operating systems are well known to those skilled in the art. One representative example of an RTOS is DSP/BIOS from Texas Instruments Incorporated. DSP/BIOS is a scalable, instrumented real-time kernel for digital signal processors. The kernel is optimized for resource-constrained, real-time embedded applications. It supports three pre-emptive thread types: tasks (blockable), software interrupts (light-weight run-to-completion threads), and hardware interrupts. Priority based scheduling is used at each thread level. The kernel includes standard synchronization primitives (e.g., semaphores, mailboxes, etc.), and includes a memory manager with support for multiple heaps for managing multiple regions and types of memories. A device model is defined for implementing streaming, device-independent I/O. The kernel also provide clock-based services: high and low-resolution time APIs, functions that run on each system tick, periodic functions that run on multiples of clock ticks, and timeouts for blocking API calls. More detailed information is available in TMS320 DSP/BIOS User's Guide, SPRU423, available on the Texas Instruments website at http://www-s.ti.com/sc/psheets/spru423b/spru423b.pdf, incorporated herein by reference.

In this embodiment, PWRM 1000 interfaces directly to processor 1004 by writing and reading a clock idle configuration register, and through Power Scaling Library (PSL) 1008. Processor 1004 may comprise a single CPU with a single clock or multi-core device with multiple clocks. PSL 1008 controls the CPU clock rate and voltage-regulation circuitry of processor 1004. PSL 1008 logically isolates PWRM 1000 and the rest of the application from the low-level implementation details of the frequency and voltage control hardware. In other embodiments where frequency and voltage scaling is not required or supported, PWRM 1000 may be present without PSL 1008. And, in other embodiments, PSL 1008 may be present without PWRM 1000.

PWRM 1000 manages all things power-related in the application, as statically configured by the application developer, and as dynamically called at runtime. In an embodiment, features of PWRM 1000 include:

Idling of Clock Domains. PWRM 1000 provides interfaces that allow a developer to idle specific clock domains to reduce active power consumption. Additionally, PWRM 1000 provides a mechanism to automatically idle the cache and CPU at the appropriate point within an application, by plugging an idling function into the RTOS 1002 idle loop.

Boot-Time Power Savings. PWRM 1000 includes a hook mechanism whereby a developer can specify a power-saving function that is automatically called at boot time.

Voltage and Frequency (V/F) Scaling. PWRM 1000 provides interfaces that allow an application to dynamically change the operating voltage and frequency of processor 1004. Applications can use this feature to adjust power consumption based upon processing requirements. The PWRM 1000 APIs allow the application to specify if voltage should be scaled along with frequency, and if execution can continue during down-voltage transitions (this latency is load-dependent, and can be large; if the processor is stable during the down-voltage transition, application execution can be allowed to continue). PWRM 1000 also includes APIs allowing query of V/F setpoint properties and latencies. A setpoint is a discrete voltage and frequency (V/F) operating point for a processor. Setpoints are chosen from characterization data for the processor. For a given frequency (F), the corresponding voltage (V) of the setpoint must be high enough to support the chosen frequency, but may be higher, depending upon the resolution of the voltage control hardware.

Sleep Modes. PWRM 1000 includes configuration and runtime interfaces that allow a developer to invoke custom sleep modes, to save power during periods of inactivity.

Registration and Notification of Power Events. To coordinate V/F scaling, sleep modes, and other power events across the entire application, PWRM 1000 includes a registration and notification mechanism that allows clients (e.g., application code, peripheral drivers, packaged content, the operating system clock module, etc.) that care about power events (e.g., 'about to change V/F setpoint', 'done changing V/F setpoint', 'going to sleep mode', 'awake from sleep mode', 'power failing', etc.), to register for notification of the specific power events they care about. Clients who care about changes to the CPU V/F setpoint may register with PWRM to be notified before and/or after a scaling event. Among other things, this registration capability handles the problems that might occur when certain clients may only be able to support proper operation at certain V/F setpoints. For example, a synchronous serial port may not be able to operate below a given frequency. To avoid the situation where the application initiates a setpoint change, and then during the notification process, PWRM 1000 discovers an entity that doesn't support the change (i.e., it says "no")—after PWRM 1000 has already told some clients that the change is being made—clients tell PWRM 1000 what setpoints they support when they register for notifications. In a sense, the V/F scaling clients say "no" up front, and not in the midst of a setpoint change. With this up front knowledge, PWRM 1000 can immediately reject setpoint change requests before initiating them. The registered entity with the least capabilities dictates the setpoints that PWRM 1000 can activate.

Figure 2:
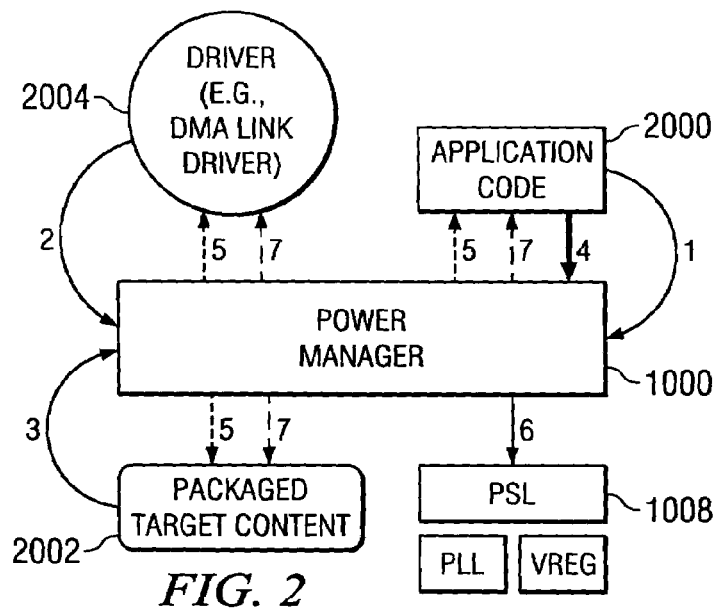
FIG. 2 illustrates a registration and notification method of a power management system.

FIG. 2 illustrates the registration and notification method of PWRM 1000. This mechanism permits an application or other entity to register for notification on the specific power events it needs to be notified about, and to un-register when it no longer needs notifications. In FIG. 2, the numbered arrows represent example steps in the registration and notification process. These steps are described with corresponding numbers below:

1. Application 2000 registers to be notified on V/F setpoint changes. For example, processor 1004 may require different external memory interface (EMIF) settings for different setpoints, so application 2000 registers control code with PWRM 1000 so that EMIF settings can be changed to follow the change in setpoint. As part of the registration, application 2000 tells PWRM 1000 the specific notification function to call when the event occurs; a client-specific argument to be passed as part of the notification; and the V/F setpoints at which the control code is capable of operating (so that PWRM 1000 will not try to initiate a change to an unsupported setpoint).
2. Driver 2004 that uses direct memory access (DMA) to transfer data to/from external memory registers to be notified of a V/F setpoint change. For example, prior to a setpoint change, the driver may need to temporarily stop DMA operations to external memory.
3. Packaged target content 2002 similarly registers with PWRM 1000 for notification on setpoint changes.
4. Application 2000 comes to a decision to change the V/F setpoint (e.g., a change in the device's mode, or maybe a task boundary), and calls the API of PWRM 1000 to initiate the setpoint change.
5. PWRM 1000 verifies the new setpoint is allowed for all registered clients, and then notifies registered clients of the impending setpoint change.
6. PWRM 1000 calls into PSL 1008 to change the voltage and frequency setpoint. PSL 1008 writes to the clock generation and voltage regulation hardware as appropriate to safely change the V/F setpoint.
7. Following the setpoint change, PWRM 1000 notifies registered clients that the setpoint has been changed.

PWRM 1000 has a number of configuration parameters, many of which may be configured statically using a graphical configuration tool. The statically configurable parameters include enabling power management, specifying a specific user function to be called at boot time to reduce power consumption, reprogramming the BIOS clock in response to a frequency scaling event, causing clock domains to be automatically idled when the CPU is idle, enabling scaling, setting the initial CPU frequency at boot, setting the initial CPU voltage at boot, enabling scaling of voltage along with frequency, waiting while voltage is scaling down, specifying the clock domains to be idled when the CPU is put into deep sleep mode, and specifying that interrupts are allowed to wake the CPU from deep sleep mode.

FIGS. 3A–3D illustrate the static configuration process of an embodiment. This static configuration is included as part of the overall configuration process of the RTOS. Configuration window 3000 comprises four sheets selectable by four tabs 3001–3004. The screen display of general tab 3001 is presented in FIG. 3A. Enable check box 3005 is used to enable/disable PWRM 1000. When check box 3005 is unchecked, all other configuration settings for PWRM 1000 become read-only and PWRM 1000 will not be included with the RTOS. Check box 3006 enables the execution of a user-defined hook function at boot time. In this example, the user has specified that the function "OEM_turnOffAudio-Amp" be called at boot time to turn off an external audio amplifier; the audio amplifier will be powered up later by user or driver code when it is actually needed. A initialization function of PWRM 1000, PWRM_init, will call the specified boot hook function before the RTOS is activated. Check box 3007 is used to indicate if the RTOS clock module should be reprogrammed following frequency scaling operating. When check box 3007 is checked, the RTOS clock module registers for setpoint change notifications, and is reprogrammed following a setpoint change. If the application does not use the on-chip timers for clock functionality, e.g., if an external clock trigger is used, this box should not be checked to save code space and eliminate unnecessary steps following a frequency scaling operation.

Figure 3A:
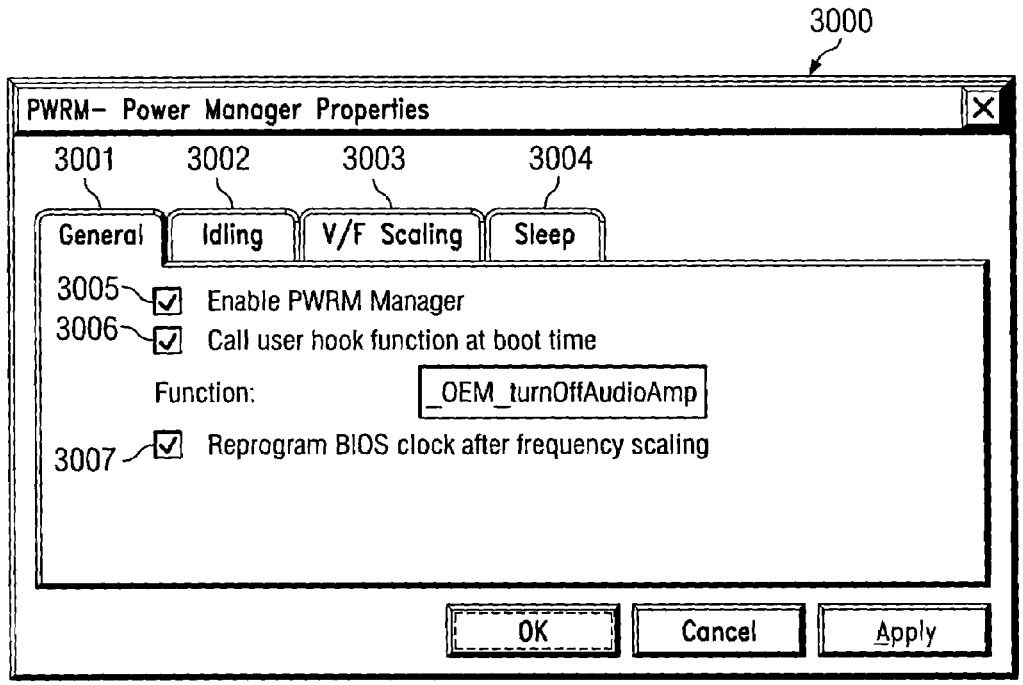
FIGS. 3A–3D illustrate the static configuration process of an embodiment of a power management system.
Figure 3B:
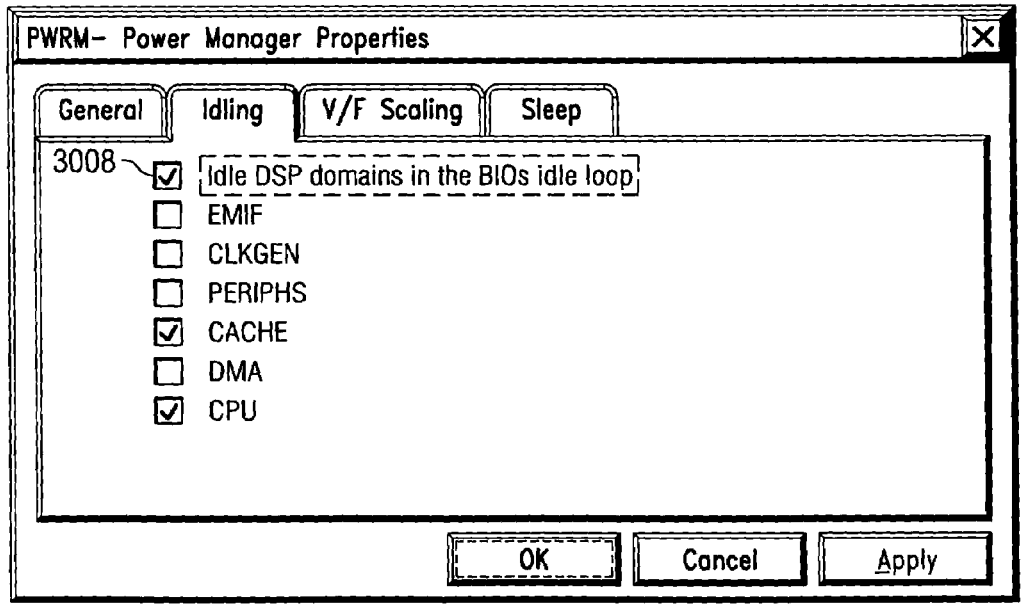

The screen display of idle tab 3002 is presented in FIG. 3B. Here, check box 3008 is used to indicate if PWRM 1000 should take action in the RTOS idle loop. If check box 3008 is checked, other check boxes become write-able to allow the user to select specific clock domains to be idled. In this example, PWRM 1000 will insert a function in the RTOS idle loop to idle the cache and CPU domains. Only valid combinations of domains are permitted, e.g., CLKGEN can only be idled if the CPU, DMA, and CACHE domains are also idled.

Figure 3C:
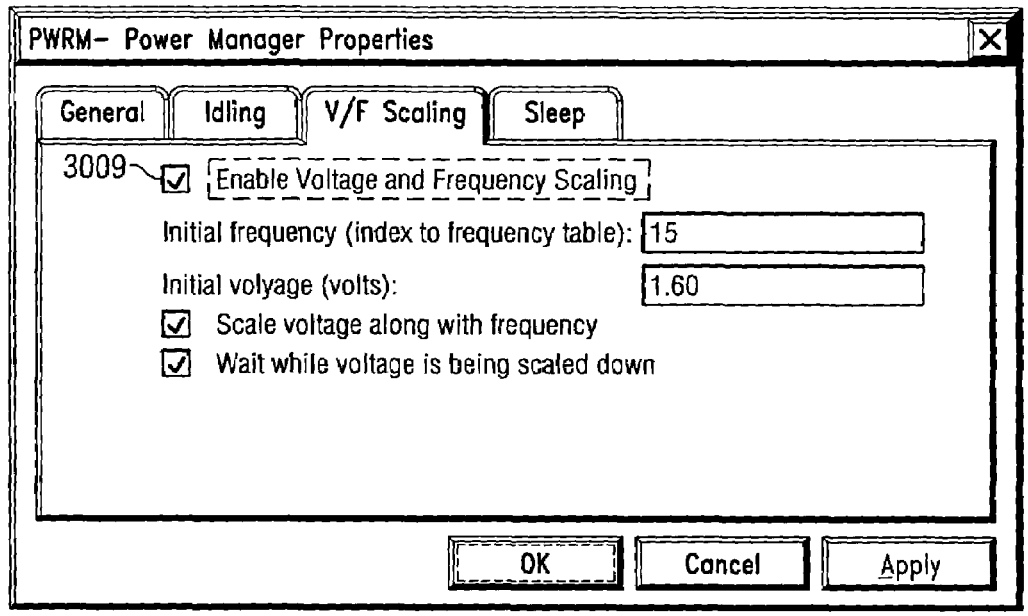

The screen display of V/F scaling tab 3003 is presented in FIG. 3C. Scaling check box 3009 is used to indicate if voltage and frequency scaling is to be enabled. If the box is checked, an appropriate version of PSL 1008 will be included with the RTOS when it is linked. When the box is not checked and PWRM 1000 is enabled, a null version of PSL 1008 is linked to resolve any references to PSL 1008 in PWRM 1000. When V/F scaling is enabled, four additional data entry boxes become active: two boxes permitting user specification of the initial frequency and voltage, a box to indicated if voltage should be scaled along with frequency, and a box to indicate whether PWRM 1000 should wait for a down-voltage transition to complete before returning control to user code after a scaling operation.

Figure 3D:
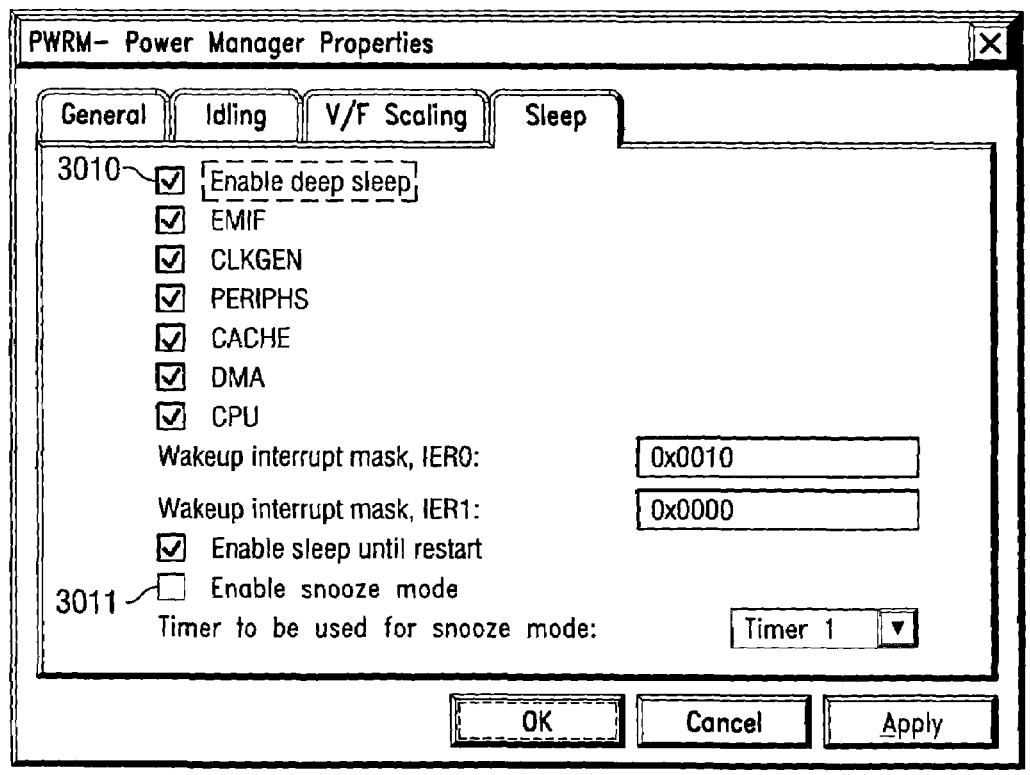

The screen display of sleep tab 3004 is presented in FIG. 3D. Sleep check box 3010 is used to indicate whether deep sleep is to be enabled. If this box is checked, the clock domain check boxes become write-able along with two entry boxes for specifying whether interrupts may awake the processor from deep sleep. In this example, the EMIF, CLKGEN, PERIPHS, CACHE, DMA, and CPU domains are selected to be idled during deep sleep, and a single wakeup interrupt is allowed, as specified by the IER0 and IER1 masks. Snooze check box 3011 is used to indicate if snooze mode is to be-enabled. If this box is checked, a drop down list is presented to allow selection of a timer to be used for timing the snooze interval.

Certain of the PWRM 1000 parameters are also re-configurable at runtime, via the PWRM 1000 API. These dynamically configurable parameters include specifying the clock domains to be automatically idled when the CPU is idle, enabling scaling of voltage along with frequency, and waiting while the voltage is scaling down.

To further clarify the capabilities of PWRM 1000, a more detailed description of an API of an embodiment is presented below. Table 4 summarizes the available API functions and the tables referenced in the table column present a more detailed description of each associated interface function, along with pseudocode describing its operation. Table 17 contains data structure definitions for the embodiment.

TABLE 4

| Function | Purpose | Table |
| --- | --- | --- |
| PWRM_changeSetpoint | Initiate a change to the V/F setpoint | 5 |
| PWRM_configure | Set new configuration parameters | 6 |
| PWRM_getCapabilities | Get information on capabilities on the current platform | 7 |
| PWRM_getCurrentSetpoint | Get the current setpoint in effect | 8 |
| PWRM_getNumSetpoints | Get the number of setpoints supported for the current platform | 9 |
| PWRM_getSetpointInfo | Get the corresponding frequency and CPU core voltage for a setpoint | 10 |
| PWRM_getTransitionLatency | Get the latency to scale from one specific setpoint to another specific setpoint | 11 |
| PWRM_idleClocks | Immediately idle clock domains | 12 |
| PWRM_registerNotify | Register a function to be called on a specific power event | 13 |
| PWRM_sleepDSP | Transition the DSP to a new sleep state | 14 |
| PWRM_snoozeDSP | Put the DSP in a deep sleep for a specified number of seconds | 15 |
| PWRM_unregisterNotify | Unregister for an event notification | 16 |

TABLE 5

PWRM_changeSetpoint
    Initiates a change to the V/F setpoint.
Syntax
    status = PWRM_changeSetpoint(IN newSetpoint, IN notifyTimeout);
Parameters
    Uns newSetpoint
        New V/F setpoint to scale to (from 1 to the maximum supported for the
        configuration).
    Uns notifyTimeout
        The maximum amount of time (in system clock ticks) for the power manager to wait for
        notification clients to respond to a delayed completion, before declaring failure and returning
        PWRM_ETIMEOUT. For example, if notifyTimeout is set to 200, while the power manager
        is notifying clients it will wait 200 ticks (typically 200 msec) before declaring that a client has
        failed to respond. Note that the power manager tracks the notifyTimeout for each
        notification sequence; for example, if clients are registered to be notified both before and
        after setpoint changes, the power manager will wait up to notifyTimeout on both types of
        notification, (before and after changing the setpoint), within the single call to
        PWRM_changeSetpoint.
Return Value
    PWRM_Status status
        PWRM_SOK on success; the new setpoint is now in effect.
        PWRM_EFAIL for a general failure; the requested setpoint transition did not occur.
        PWRM_EOUTOFRANGE if newSetpoint is out of the range of valid setpoints for the
        platform; the requested setpoint transition did not occur.
        PWRM_ENOTSUPPORTED if newSetpoint indicates a setpoint that a registered client
        does not support; the requested setpoint transition did not occur.
        PWRM_ENOTIMPLEMENTED if V/F scaling is not supported.
        PWRM_EBUSY if PWRM is currently busy processing a previous request.
        PWRM_EINITFAILURE if a failure occurred while initializing V/F scaling support.
        PWRM_ETIMEOUT if a notification client did not complete a delayed completion

TABLE 5-continued within the specified notifyTimeout.
When PWRM_changeSetpoint returns PWRM_ETIMEOUT or PWRM_EFAIL this should be considered a critical system failure, as a client is deemed unresponsive, and the system is now in an
unknown state.
Pseudocode
    check if V/F scaling supported, if not return PWRM_ENOTIMPLEMENTED;
    check if requested setpoint is allowed, if not return PWRM_ENOTSUPPORTED;
    stop TSK and SWI scheduling, retain HWIs for completion detection;
    notify clients registered for PWRM_PENDINGSETPOINTCHANGE;
    if timeout return PWRM_ETIMEOUT;
    call PSL to do the scaling op;
    notify clients registered for PWRM_DONESETPOINTCHANGE;
    if timeout return PWRM_ETIMEOUT;
    resume TSK and SWI scheduling;

TABLE 6

PWRM_configure
    Specifies new configuration parameters for the power manager, overriding those specified via static configuration settings.
Syntax
    status = PWRM_configure(IN attrs);
Parameters
    PWRM_Attrs attrs
        Configuration attributes for the power manager module.
            scaleVoltage
                Flag indicating if the power manager should scale voltages during setpoint changes. For example, if scaleVoltage is TRUE, the voltage will be scaled down, when possible, when going to a lower frequency. If scaleVoltage is FALSE, the voltage will not be scaled lower to follow the lower frequency of the new setpoint. The voltage will always be scaled up when the destination setpoint frequency is higher than that supported at the current voltage.
            waitForVoltageScale
                Flag indicating if the power manager should wait for a down-voltage transition to complete before returning. [Note: for up-voltage transitions the power manager must wait for the transition to complete before up-scaling frequency.]
            idleMask
                Bitmask specifying the domains to be idled in the BIOS idle loop (i.e., the value to be written to the ICR register before idling the processor).
Return Value
    PWRM_Status status
        PWRM_SOK on success.
        PWRM_EFAIL for a general failure.
        PWRM_EINVALIDPOINTER if attrs is NULL.
        PWRM_EINVALIDVALUE if scaleVoltage, waitForVoltageScale, or idleMask are invalid.
Pseudocode
    validate parameters;
    simply copy elements from attrs structure to PWRM_Config object;

TABLE 7

PWRM_getCapabilities
    Returns information on the power manager's capabilities on the current platform.
Syntax
    status = PWRM_getCapabilities(OUT capsMask);
Parameters
    Uns *capsMask
        Pointer to location to store bitmask defining the power managers capabilities. The following pre-defined bitmasks can be used to check if the power manager implements the capability on the current platform.
    PWRM_CDEEPSLEEP
        PWRM_sleepDSP implements PWRM_DEEPSLEEP.
    PWRM_CSLEEPUNTILRESTART
        PWRM_sleepDSP implements PWRM_SLEEPUNTILRESTART.
    PWRM_CSNOOZE
        PWRM_snoozeDSP is implemented.
    PWRM_CVFSCALING
        PWRM supports voltage and frequency scaling.
    [For example, if (*capsMask & PWRM_CVFSCALING) != 0, then V/F scaling is supported.]
Return Value
    PWRM_Status status

TABLE 7-continued

PWRM_SOK on success.
PWRM_EFAIL for a general failure.
PWRM_EINVALIDPOINTER if capsMask is NULL.
Pseudocode
    read generated configuration info, fill in and return capabilities mask;

TABLE 8

PWRM_getCurrentSetpoint
    Returns the current setpoint in effect.
Syntax
    status = PWRM_getCurrentSetpoint(OUT setpoint);
Parameters
    Uns * setpoint
        Pointer to location to store the current V/F setpoint in effect.
Return Value
    PWRM_Status status
        PWRM_SOK on success.
        PWRM_EFAIL for a general failure.
        PWRM_EINVALIDPOINTER if setpoint is NULL.

TABLE 8-continued

PWRM_EINITFAILURE if a failure occurred while initializing V/F scaling support.
        PWRM_ENOTIMPLEMENTED if V/F scaling is not supported.
Pseudocode
    check if V/F scaling supported, if not return PWRM_ENOTIMPLEMENTED;
    call PSL_getSetpoints to determine the current setpoint;
    if get PSL_OK return code then return the indicated setpoint;
        else return PWRM_EFAIL to indicate failure;

TABLE 9

PWRM_getNumSetpoints
    Returns the number of setpoints supported for the current configuration.
Syntax
    status = PWRM_getNumSetpoints(OUT numberSetpoints);
Parameters
    Uns * numberSetpoints
        Pointer to the location to store the number of V/F setpoints supported in this
        configuration. If V/F scaling is supported a value of at least 1 will be returned.
Return Value
    PWRM_Status status
        PWRM_SOK on success.
        PWRM_EFAIL for a general failure.
        PWRM_EINVALIDPOINTER if numberSetpoints is NULL.
        PWRM_EINITFAILURE if a failure occurred while initializing V/F scaling support.
        PWRM_ENOTIMPLEMENTED if V/F scaling is not supported.
Pseudocode
    check if V/F scaling supported, if not return PWRM_ENOTIMPLEMENTED;
    call PSL_getNumSetpoints to determine the current setpoint;
    if get PSL_OK return code then return the indicated number;
        else return PWRM_EFAIL

TABLE 10

PWRM_getSetpointInfo
    Returns the frequency and CPU core voltage for a setpoint.
Syntax
    status = PWRM_getSetpointInfo(IN setpoint, OUT frequency, OUT voltage);
Parameters
    Uns setpoint
        The setpoint to query.
    float * frequency
        Pointer to location to store the DSP core frequency for setpoint.
    float * voltage
        Pointer to location to store the voltage for setpoint.
Return Value
    PWRM_Status status
        PWRM_SOK on success.
        PWRM_EFAIL for a general failure.
        PWRM_EINVALIDVALUE if setpoint is invalid.
        PWRM_EINVALIDPOINTER if frequency or voltage are NULL.

TABLE 10-continued

PWRM_EINITFAILURE if a failure occurred while initializing V/F scaling support.
PWRM_ENOTIMPLEMENTED if V/F scaling is not supported.
Pseudocode
    check if V/F scaling supported, if not return PWRM_ENOTIMPLEMENTED;
    check if setpoint is valid, if not return PWRM_EINVALIDVALUE;
    call PSL_querySetpoints to get the CPU frequency and voltage for the specified setpoint;

TABLE 11

PWRM_getTransitionLatency
    Returns the latency to scale from one specific setpoint to another specific setpoint.
Syntax
    status = PWRM_getTransitionLatency(IN initialSetpoint, IN finalSetpoint, OUT latency);
Parameters
    Uns initialSetpoint
        The setpoint to be scaled from.
    Uns finalSetpoint
        The setpoint to be scaled to.
    Uns * latency
        The location to store the transition latency. This latency is in microseconds, and indicates
        the time to scale frequency and voltage from the initialSetpoint to the finalSetpoint.
Return Value
    PWRM_Status status
        PWRM_SOK for success.
        PWRM_EFAIL for a general failure.
        PWRM_EINVALIDVALUE if initialSetpoint or finalSetpoint are invalid.
        PWRM_EINVALIDPOINTER if latency is NULL.
        PWRM_EINITFAILURE if a failure occurred while initializing V/F scaling support.
        PWRM_ENOTIMPLEMENTED if V/F scaling is not supported.
Pseudocode
    check if V/F scaling supported, if not return PWRM_ENOTIMPLEMENTED;
    check if setpoints are valid, if not return PWRM_EINVALIDVALUE;
    call PSL_getSetpointTransitions to get frequency and voltage scaling latency for specified setpoints;
    if voltage scaling is enabled then check if voltage latency is biggest;
                else, simply return frequency latency;

TABLE 12

PWRM_idleClocks
    Immediately idle (i.e., turn off) clock domains. [The purpose of this function is to allow the
    application to idle non-CPU domains from anywhere in the application. The function will
    immediately return and indicate error if an attempt is made to idle the CPU or CLKGEN
    domains; these domains should only be idled in the idle loop (see PWRM_configure).]
Syntax
    status = PWRM_idleClocks(IN domainMask);
Parameters
    Uns domainMask
        The bitmask of clock domains to be idled.
Return Value
    PWRM_Status status
        PWRM_SOK for success.
        PWRM_EINVALIDVALUE if a domain specified in domainMask cannot be idled by
        this function (e.g., CPU, CLKGEN).
        PWRM_ENOTIMPLEMENTED if this function is not implemented.
Pseudocode

TABLE 13

PWRM_registerNotify
    Registers a function to be called on a specific power event. [Registrations and the corresponding
    notifications are processed in FIFO order.]
Syntax
    PWRM_registerNotify(IN eventType, IN eventMask, IN notifyFxn, IN clientArg,
        OUT notifyHandle, OUT delayedCompletionFxn);
Parameters
    PWRM_Event eventType
        The type of power event for which the notify function is to be called:
            PWRM_PENDINGSETPOINTCHANGE
                The V/F setpoint is about to change.
            PWRM_DONESETPOINTCHANGE
                The V/F setpoint that was pending has now been changed.
            PWRM_GOINGTODEEPSLEEP

TABLE 13-continued

The DSP is going to deep sleep.
PWRM_AWAKEFROMDEEPSLEEP
  The DSP has awoken from deep sleep.
PWRM_GOINGTOSLEEPUNTILRESTART
  The DSP is going to deep sleep and must be restarted to resume.
LgUns eventMask
  An event-specific mask. For V/F setpoint registrations this mask will define the
  setpoints the client supports. For example, if only one of the setpoints exported by
  the power manager is supported by the client, only the single corresponding bit in
  eventMask will be set. V/F event clients specify eventMask at registration time so the
  power manager will be able to determine before it starts a setpoint transition if one of the
  registered clients cannot support it; in this case PWRM_changeSetpoint will not start the
  notification process, but will immediately return PWRM_ENOTSUPPORTED.
Fxn notifyFxn
  This is the client's function that should be called by the power manager when the specified
  power event has occurred. When the client's function is called, the clientArg will be
  passed back to the client. The purpose here is to allow a notify function to be used by
  multiple instances of a driver (e.g., the clientArg can be used to identify the instance of the
  driver that is being notified).
Arg clientArg
  An arbitrary argument to be passed to the client on notification.
PWRM_notifyHandle * notifyHandle
  This is a notification handle that is returned to the client. When it is time to
  unregister the function the client should pass this handle to the PWRM_unregisterNotify
  function. [A handle is used so that the same notify function can be registered by
  multiple clients (e.g., multiple instances of a driver.)]
Fxn * delayedCompletionFxn
  This is the function the client should call if it cannot act immediately upon the
  notification. For example, if a DMA driver is to prepare for a setpoint change it may
  need to wait for the current DMA transfer to complete. If so, its notify function will
  return PWRM_NOTIFYNOTDONE, and when the action is complete, the driver will call
  the delayedCompletionFxn to signal the power manager that it has finished. If the client
  can and does act immediately on the notification it will return PWRM_NOTIFYDONE in
  response to the notification.
Return Value
  PWRM_Status status
    PWRM_SOK for successful registration.
    PWRM_EFAIL for a general failure.
    PWRM_EINVALIDEVENT if eventType is invalid.
    PWRM_EINVALIDPOINTER if notifyFxn, notifyHandle or delayedCompletionFxn are
    NULL.
Pseudocode
  check to make sure event type is valid, if not return PWRM_EINVALIDEVENT;
  validate pointers (notifyFxn, notifyHandle, delayedCompletionFxn);
  for V/F scaling update the setpoint mask (_PWRM_allowedSPmask) to reflect client's limitations
  allocate a notification object; if fail return FALSE;
  fill in the notification object elements;
  enqueue the notification object on the appropriate event queue;
  set the notifyHandle and delayedCompletionFxn out params;

TABLE 14

PWRM_sleepDSP
  Transitions the DSP to a new sleep state.
Syntax
  status = PWRM_sleepDSP(IN sleepCode, IN notifyTimeout);
Parameters
  Uns sleepCode
    A command code indicating the new sleep state for the DSP:
      PWRM_DEEPSLEEP
        Put the DSP in deep sleep.
      PWRM_SLEEPUNTILRESTART
        Idle all DSP clock domains; only way to wakeup is a DSP reset.
  Uns notifyTimeout
    The maximum amount of time (in system clock ticks) for the power manager to wait for
    notification clients to respond for a delayed completion, before declaring failure and
    returning PWRM_ETIMEOUT. For example, if notifyTimeout is set to 200, while
    the power manager is notifying clients it will wait 200 ticks (typically 200 msec) before
    declaring that a client has failed to respond. Note that the power manager tracks the
    notifyTimeout for each notification sequence; for example, if clients are registered to be
    notified both before and after deep sleep state changes, PWRM will wait up to notifyTimeout
    on both types of notification, (before and after changing the sleep state), within the single
    call to PWRM_sleepDSP.
Return Value
  PWRM_Status status
    PWRM_SOK for successful sleep and wake.

TABLE 14-continued

```
        PWRM_EFAIL if unable to sleep the DSP.
        PWRM_ENOTIMPLEMENTED if the requested sleep state is not implemented.
        PWRM_EBUSY if PWRM is currently busy processing a previous request.
        PWRM_ETIMEOUT if a notification client did not complete a delayed completion
                within the specified notifyTimeout.
        Note that because of the critical "system" nature of sleep commands, clients that
        register for sleep notifications cannot say 'no' when notified of a sleep event. They must
        do their best to immediately act on the sleep command. For PWRM_DEEPSLEEP this
        function will return once the DSP is awoken from deep sleep. For
        PWRM_SLEEPUNTILRESTART this function will not return. When PWRM_sleepDSP
        returns PWRM_ETIMEOUT or PWRM_EFAIL this should be considered a critical system
        failure, as a client is deemed unresponsive, and the system is now in an unknown state.
Pseudocode
    check if sleep mode is supported, if not return PWRM_ENOTIMPLEMENTED;
    if sleep code is PWRM_SLEEPUNTILRESTART:
        notify all registered PWRM_GOINGTOSLEEPUNTILRESTART clients;
        if timeout return PWRM_ETIMEOUT;
        set IER registers to zero to disable all interrupts;
        set ICR to 0x3F to get ready to idle all domains;
        call IDLE instruction;
    else if sleep code is PWRM_DEEPSLEEP;
        notify all registered PWRM_GOINGTODEEPSLEEP clients;
        if timeout return PWRM_ETIMEOUT;
        save current IER masks;
        set IER registers to configured masks for deep sleep wake interrupts;
        set ICR to that configured via config tool, to get ready to idle domains;
        save current ISTR mask (domains currently idled);
        call IDLE instruction;
        on wake write to ICR to restore idled domains on entry;
        call IDLE instruction;
        restore IER masks on entry;
        notify all registered PWRM_AWAKEFROMDEEPSLEEP clients;
        if timeout return PWRM_ETIMEOUT;
```

TABLE 15

```
PWRM_snoozeDSP
    Puts the DSP in deep sleep for a specified number of seconds.
Syntax
    status = PWRM_snoozeDSP(IN seconds);
Parameters
    Uns seconds
        The number of seconds that the DSP should sleep.
Return Value
    PWRM_Status status
        PWRM_SOK if the DSP slept for the specified number of seconds and is now awake.
        PWRM_ENOTIMPLEMENTED if snooze is not implemented.
        PWRM_EBUSY if the power manager is currently busy processing a previous request.
        PWRM_EOUTOFRANGE if unable to sleep because the seconds value is out of range
        of the capabilities of the power manager.
Pseudocode
    check can program PLL & timer to achieve the specified snooze interval,
        with reasonable periodic wakeups;
    notify all registered PWRM_GOINGTODEEPSLEEP clients;
    if timeout return PWRM_ETIMEOUT;
    program timer for the snooze and unmask its interrupt as sole wakeup source;
    while specified snooze interval hasn't been reached {
     go to deep sleep (except for clock and timer domains);
     when wake, if need multiple wakeups to achieve overall time,
                decrement count and go back to snooze;
    }
    notify all registered PWRM_AWAKEFROMDEEPSLEEP clients
     if timeout return PWRM_ETIMEOUT;
```

TABLE 16

```
PWRM_unregisterNotify
    Unregister for an event notification from the PWRM module.
    [For example, an audio codec
    device is closed, and the notification is no longer needed.]
Syntax
    status = PWRM_unregisterNotify(IN notifyHandle);
Parameters
    PWRM_notifyHandle notifyHandle
        This is the handle returned by PWRM_registerNotify
        when the function was registered
        for notification.
Return Value
    PWRM_Status status
        PWRM_SOK for successful unregistration.
```

TABLE 16-continued

PWRM_EINVALIDHANDLE if notifyHandle is invalid.
PWRM_EFAIL for a general failure.
Pseudocode
   if notifyHandle is NULL return PWRM_EINVALIDHANDLE;
   atomically remove the notification object from its event queue;
   free the notification object memory;
   for V/F scaling un-registration update the valid setpoint mask
     (_PWRM_allowedSPmask) to remove client's limitations

TABLE 17

```
typedef struct PWRM_Config {
  Bool scaleVoltage;
  Bool waitForVoltageScale;
  Uns idleMask;
} PWRM_Config;
typedef struct PWRM_Attrs {
  Bool scaleVoltage;
  Bool waitForVoltageScale;
  Uns idleMask;
} PWRM_Attrs;
PWRM_Attrs PWRM_ATTRS = {
  FALSE,   /* scaleVoltage */
  FALSE,   /* waitForVoltageScale */
  0,       /* idleMask */
};
typedef struct {
  QUE_Elem link;
  PWRM_Event eventType;
  Fxn notifyFxn;
  Arg clientArg;
  LgUns eventMask;
} PWRM_notifyObj;
QUE_Obj PWRM_notifyQueues[PWRM_NUMQUEUES] =
}
  {&PWRM_notifyQueues[0], &PWRM_notifyQueues[0]},
  {&PWRM_notifyQueues[1], &PWRM_notifyQueues[1]},
  {&PWRM_notifyQueues[2], &PWRM_notifyQueues[2]},
  {&PWRM_notifyQueues[3], &PWRM_notifyQueues[3]},
  {&PWRM_notifyQueues[4], &PWRM_notifyQueues[4]},
};
Void * PWRM_delayCompletionFxns[PWRM_NUMQUEUES] =
{
  _PWRM_delayCompletion0,
  _PWRM_delayCompletion1,
  _PWRM_delayCompletion2,
  _PWRM_delayCompletion3,
  _PWRM_delayCompletion4,
};
Void_PWRM_delayCompletion0(Void)
{
  ATM_deci(&PWRM_notifyWaitCount[0]);
}
...
volatile Int PWRM_notifyWaitCount[PWRM_NUMQUEUES] =
{
  0,
  0,
  0,
  0,
  0,
  0
};
```

A complete power management strategy includes runtime power management support as described herein, plus the ability to measure power consumption as an application executes to gauge the effectiveness of different runtime power management techniques. By varying techniques and comparing the resulting power consumption, an application developer can choose the appropriate techniques for the application and/or tune operating parameters for optimal performance. Coupling runtime power management support with a measurement tool enables a new application development flow, whereby power consumption is measured and tuned as part of the regular application development process rather than waiting until development is complete.

Figure 4:
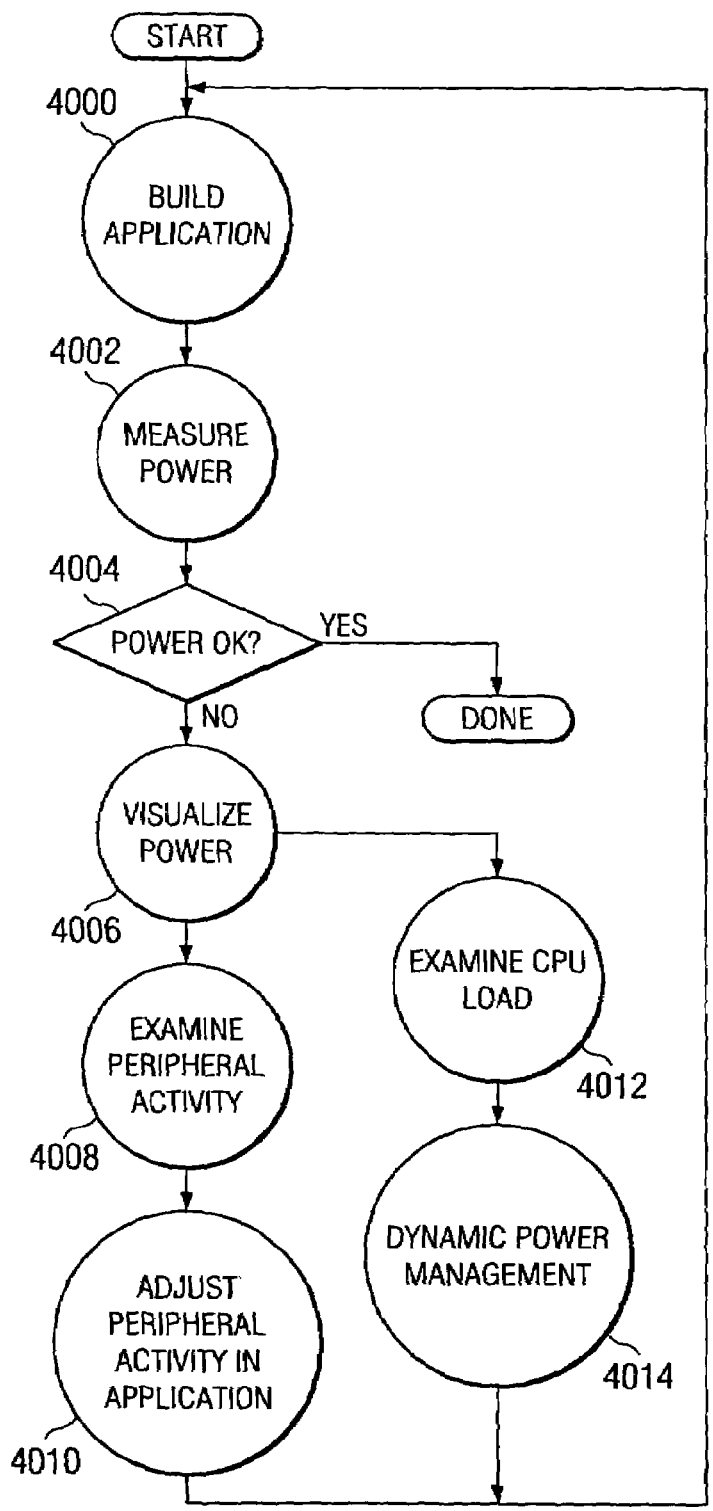
FIG. 4 illustrates a method for application development that includes developing a power management strategy for the application.

FIG. 4 illustrates a method for application development that includes developing a power management strategy for the application. The flow of this method is iterative in nature, comprising profiling of power consumption, visualization, and tuning. Power consumption is measured and tuned early in the development flow, rather than one of the last steps of development. At step 4000, the application is built to run on the target processor. At step 4002, the power consumption of the application is measured during execution on the target processor. As step 4004 illustrates, if the power consumption is acceptable, no tuning is necessary and the tuning process is complete. Otherwise, step 4006 is executed. At step 4006, the power measurements taken during step 4002 are analyzed to find "hot spots" in the application that may be consuming too much power. These power measurements may be taken at various levels of granularity, i.e., at a specified single execution sequence, at the function level, or at the task level, to facilitate locating "hot spots." The application developer may choose to optimize the code in the identified areas so that less power is consumed. As steps 4008 and 4012 illustrate, the developer may also examine the application's peripheral status data, i.e. data regarding the on/off status of peripherals, and the overall CPU load. Examination of the peripheral activity of the application may reveal places in the application execution where certain peripherals may be turned off. If peripherals do not need to be on during portions of the execution, the developer may adjust the peripheral activity accordingly, as shown by step 4010. Examination of the CPU load may reveal that there are points in the application execution where extra CPU cycles are available. If this is the case, it may be that those portions of the application can be executed at a lower clock frequency and lower voltage. The user may modify the application to call the appropriate PWRM 1000 and/or functions of PSL 1008 to cause the voltage and frequency to scaled dynamically, as illustrated by step 4014. If changes have been made in any of the above steps, the process is repeated beginning at step 4000.

Figure 5:
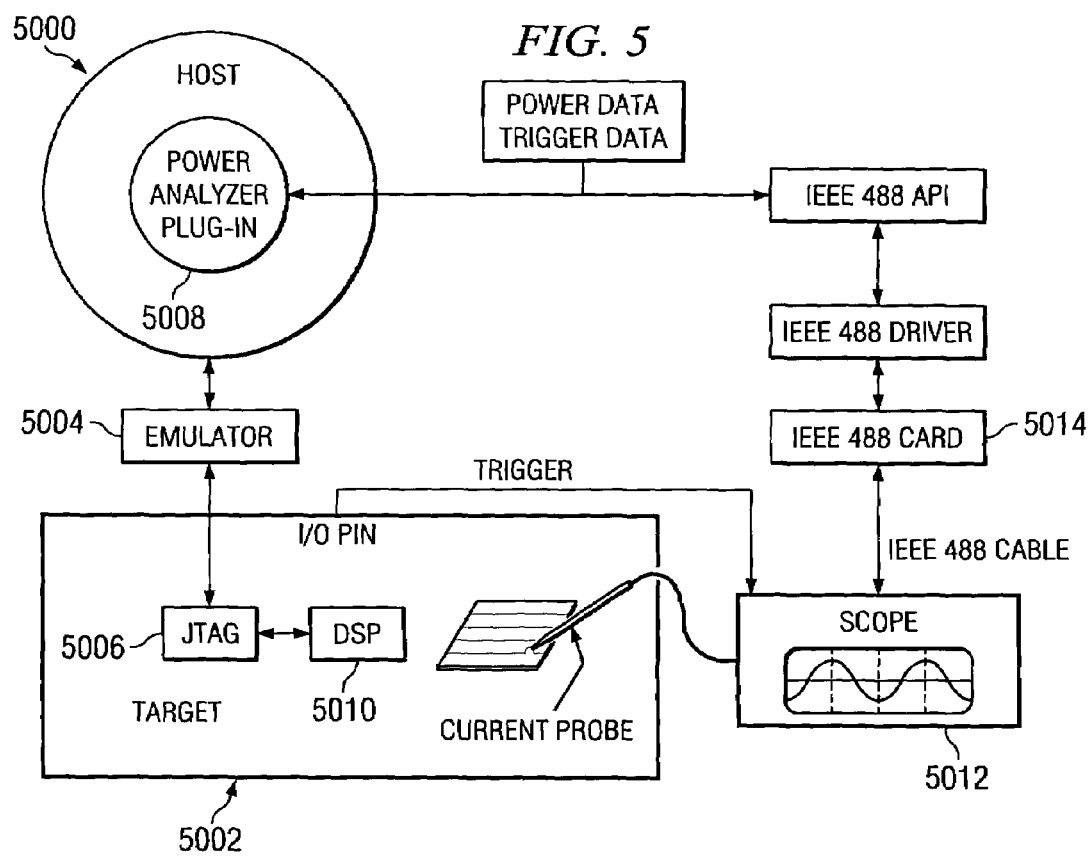
FIG. 5 presents an embodiment of a minimally intrusive system for power profiling of an embedded application that enables the method of FIG. 4.

FIG. 5 presents an embodiment of a minimally intrusive system for power profiling of an embedded application that enables the method of FIG. 4. The system comprises host computer 5000 connected to target system 5002 through emulation controller 5004. Host computer 5000 provides an integrated software development environment including debug software, a compiler, a linker, an editor, and other tools for developing an application. The software development environment further comprises software for sending and receiving information between the software development environment and target system 5002 through emulator 5004. Typically, emulation controller 5004 is connected to target system 5002 through a JTAG (IEEE 1149.1) test access port 5006. The integrated software development environment also comprises power analysis software 5008 and the RTOS graphical configuration tool that provides static configuration of PWRM 1000.

An embedded application with a logical architecture as illustrated in FIG. 1 is built on host computer 5000 and downloaded to target system 5002. Target system 5002 is comprised of at least one digital signal processor (DSP) 5010. DSP 5010 comprises emulation circuitry providing a standard JTAG debug interface with two additional terminals or pins (interchangeably referred to as nET1 and nET2 or EMU0 and EMU1) supporting various extended debugging capabilities. Such emulation circuitry is well known in the art and is described in detail in U.S. Pat. No. 5,828,824 issued to Gary Swoboda. These terminals may be used to export trigger signals from DSP 5010 without interfering with any other functionality of the standard JTAG debug interface. These terminals may be made available for triggering a power measurement device. Other pins of DSP 5010 may also be used to export trigger signals, such as an XF pin, any general purpose I/O (GPIO) pin or any user configurable pin that can be controlled through software.

Various types of power measurement devices, e.g. oscilloscopes, multimeters, special purpose boards, etc., and means for connecting the devices to the system may be employed. In this embodiment, the power measurement device is oscilloscope 5012. Oscilloscope 5012 is connected by a current probe to a power measurement point on target system 5002. It receives signals to start and stop power measurements via a trigger connected to target system 5002. Oscilloscope 5012 is also connected to host computer 5000 via Interface Board 5014 to permit collection of power measurement data.

The system of FIG. 5 is able to measure power consumption in real-time of an application executing on target system 5002. Power analysis software 5008 can collect power measurement data in real-time at a function or task level and correlate that data to show the power consumption of the application by function or task so that power "hot spots" may be identified. Power analysis software 5008 can also collect power measurement data for a user-specified execution range. Power measurements may include total energy, maximum and average power consumption, and peripheral activity. These measurements may be displayed in either textual or graphical form. Pending U.S. patent application Ser. No. 10/325,024 entitled Power Profiling System and Method for Correlating Runtime Information (TI 34464) describes the capabilities of such power analysis systems in more detail and is incorporated herein by reference.

PSL 1008 of FIG. 1 comprises a software library providing functionality to allow applications developers to incorporate functionality in an application to manage both frequency and voltage scaling. PSL 1008 provides hardware abstraction, portability, and a standard API that enables its use on differing processors. Entities of the application (e.g., application code, peripheral drivers, packaged content, the operating system clock module, etc.) may utilize this API to manage frequency and voltage scaling. Included in the API are routines that initiate scaling operations, and various query routines that provide information on current settings and available frequency/voltage settings. Frequency changes are initiated directly by entity request. Voltage changes are performed indirectly by PSL 1008 when a frequency changes is requested. PSL 1008 will automatically scale the voltage to the minimum level required by the requested frequency. In this way, PSL 1008 ensures a valid frequency/voltage setting at all times.

In an embodiment, PSL 1008 is delivered as two code libraries: a scaling library and a configuration library. The scaling library contains a target specific implementation of scaling functionality. A distinct scaling library is provided for each processor/voltage regulator control scheme combination as different processors may have different clock generators, and different regulators may have different methods of control. The configuration library provides system and target board specific data to the scaling library. This configuration library contains user configurable data permitting a scaling library implementation to be adapted to custom target boards.

An embodiment of PSL 1008 is presented below. In this embodiment, the target processor is the TMS320C5510 ("C5510") from Texas Instruments Incorporated. The C programming language is used for the examples. In this embodiment, the scaling library is PSL.lib and the configuration library is PSL_cfg.lib.

PSL_cfg.lib comprises two configuration data files PSLclk_cfg.c and PLSvolt_cfg.c. The file PSLclk_cfg.c contains configuration data relating to the clock(s) that will be controlled by the scaling library. The data in this file is device-specific, but typically, it will include items such as input frequency, maximum operating frequency, the table of operating frequencies that will be supported by the scaling library, and perhaps some latency information relating to frequency scaling operations. The variable declarations for this data, as well as the type definitions that define the structure of this data, are provided in a separate file, PSLclk_cfg.h.

The file PSLvolt_cfg.c contains configuration data relating to the operating voltages that are supported by the device, and data relating to the voltage regulator controller. This file will typically include a table of voltages and their corresponding maximum frequencies, data that specifies how the voltage regulator is controlled, and latency information relating to voltage scaling operations. The variable declarations for this data, as well as the type definitions that define the structure of this data, are provided in a separate file, PSLvolt_cfg.h.

The scaling library does not require a specific voltage regulator control scheme. Instead, the scaling library provides built-in support for a default control scheme, and a mechanism that allows application developers to override the built-in support for custom target boards.

For the C5510, which has only one clock, the clock configuration data contained in PSLclk_cfg.c and its associated declarations file PSLclk_cfg.h is presented in Tables 18–21. The clock configuration variables are described in Table 18.

TABLE 18

| Variable | Description | Code |
| --- | --- | --- |
| PSL_clkmdRegAddr | specifies the address of the clock mode register in I/O space | const unsigned PSL_clkmdRegAddr = 0x1C00; |
| PSL_cpuMaxFreq | specifies the maximum frequency, in MHz units, at which it is safe to operate the CPU. The maximum frequency of the CPU on the C5510 DSK is 200 MHz. This maximum frequency should be obtained from the device's data sheet. | const float PSL_cpuMaxFreq = 200.0f; |
| PSL_cpuInputFreq | specifies the input frequency (CLKIN) in MHz units. The input frequency on the C5510 is 24 MHz. | const float PSL_cpuInputFreq = 24.0f; |

TABLE 18-continued

| Variable | Description | Code |
|---|---|---|
| PSL_cpuFreqCnt | specifies the number of frequencies that will be supported by the PSL. It also specifies the number of entries in the frequency table of Table 19. Here, acceptable values are those in the range 1 . . . 16. | const unsigned PSL_cpuFreqCnt = 16; |

Table 19 presents a definition of the frequency table, PSL_cpuFreqTable. PSL_cpuFreqTable contains the frequencies that are supported by the scaling library. In this example, the table may contain from 1 to 16 frequencies. Internally, the scaling library creates a setpoint for each frequency. The ordering of the setpoints matches the ordering of the frequencies in the frequency table. Each entry in the frequency table is of type PSL_CPUFreq, which is defined in the file PSLclk_cfg.h. The definition of PSL_CPUFreq is contained in Table 6. In this definition, PLL_mult is a value in the range 2 . . . 31. This value, in conjunction with the input frequency and PLL_div, determines the CPU clock frequency when operating in lock mode. PLL_div is a value in the range 0 . . . 3. This value, in conjunction with the input frequency and PLL_mult, determines the CPU clock frequency when operating in lock mode bypass_div is a value in the range 0 . . . 3. It specifies the input frequency divider when operating in bypass mode.

The clock generator on the C5510 device has two operating modes: bypass and lock mode. The type PSL_ClkMode, which is defined in PSLclk_cfg.h, represents these modes. The definition of PSL_ClkMode is presented in Table 19. In PSL_BYPASS mode, the PLL is bypassed and the frequency of the output clock signal is equal to the frequency of the input clock signal divided by 1, 2, or 4. Because the PLL is disabled in this case, this mode consumes less power. In PSL_LOCK mode, the input frequency can be both multiplied and divided to produce the desired output frequency. In bypass mode, the clock frequency can be calculated using the following equation:

Clock frequency=input frequency/(bypass_div+1)

In lock mode, the clock frequency can be calculated using the following equation:

Clock frequency=(*PLL_mult*/(*PLL*_div+1))*input frequency

TABLE 19

```
PSL_CPUFreq PSL_cpuFreqTable[ ] = {
{0, 0, 3, PSL_BYPASS}, // 6 MHz (input freq / 4), bypass mode
{0, 0, 1, PSL_BYPASS}, // 12 MHz (input freq / 2), bypass mode
{0, 0, 0, PSL_BYPASS}, // 24 MHz (input freq / 1), bypass mode
{ 2, 0, 0, PSL_LOCK}, // 48 MHz (input freq * (2 / 1)), lock mode
{ 5, 1, 0, PSL_LOCK}, // 60 MHz (input freq * (5 / 2)), lock mode
{ 3, 0, 0, PSL_LOCK}, // 72 MHz (input freq * (3 / 1)), lock mode
{ 7, 1, 0, PSL_LOCK}, // 84 MHz (input freq * (7 / 2)), lock mode
{ 4, 0, 0, PSL_LOCK}, // 96 MHz (input freq * (4 / 1)), lock mode
{ 9, 1, 0, PSL_LOCK}, // 108 MHz (input freq * (9 / 2)), lock mode
{ 5, 0, 0, PSL_LOCK}, // 120 MHz (input freq * (5 / 1)), lock mode
{11, 1, 0, PSL_LOCK}, // 132 MHz (input freq * (11 / 2)), lock mode
{ 6, 0, 0, PSL_LOCK}, // 144 MHz (input freq * ( 6 / 1)), lock mode
{13, 1, 0, PSL_LOCK}, // 156 MHz (input freq * (13 / 2)), lock mode
{ 7, 0, 0, PSL_LOCK}, // 168 MHz (input freq * ( 7 / 1)), lock mode
{15, 1, 0, PSL_LOCK}, // 180 MHz (input freq * (15 / 2)), lock mode
{25, 2, 0, PSL_LOCK}, // 200 MHz (input freq * (25 / 3)), lock mode
};
```

TABLE 20

```
typedef struct {
    unsigned PLL_mult;
    unsigned PLL_div;
    unsigned bypass_div;
    PSL_ClkMode mode;
} PSL_CPUFreq;
```

TABLE 21

```
typedef enum { // clock's operating mode
    PSL_BYPASS,
    PSL_LOCK
} PSL_ClkMode;
```

The file PSLvolt_cfg.c contains voltage configuration data relating to the operating voltages that are supported by processor, and data relating to the voltage regulator controller. The variable declarations for this data, as well as the type definitions that define the structure of this data, are provided in PSLvolt_cfg.h. The voltage configuration data for the C5510 device is presented below.

PSL_voltCnt, defined as const unsigned PSL_voltCnt=2;, specifies the number of voltage points that are supported by the voltage regulator. The C5510 can operate at two different voltages so the value PSL_voltCnt is set to 2. The voltage table, PSL_voltTable, lists the supported voltage points and their associated maximum frequencies. These values are generally obtained from the device's data sheet. The voltages are listed in increasing order starting with the smallest. Each entry in the voltage table is of type PSL_VoltTable, which is defined in the file PSLvolt_cfg.h. The definition of the type PSL_VoltTable is shown in Table 22 where volt specifies a voltage point, and freq specifies the maximum operating frequency for this voltage. The maximum operating frequency for a given voltage should be obtained from the device's data sheet.

TABLE 22

```
typedef struct {
float volt; // voltage
float freq; // frequency for PSL_CPU_CLK
}
PSL_VoltTable;
```

The voltage table for the C5510 is shown in Table 23.

TABLE 23

```
PSL_VoltTable PSL_voltTable[ ] = {
{1.1f, 72.0f}, // 0 MHz up to, and including 72 MHz, require a
    // minimum voltage of 1.1V.
{1.6f, 200.0f}, // frequencies > 72 MHz up to the max frequency
    // require a minimum voltage of 1.6V.
};
```

Table 24 describes other data comprising the voltage configuration file. Any data that is related to GPIO pins is only present if one or more GPIO pins are to be used to control the voltage regulator.

TABLE 24

| Variable | Description | Code |
| --- | --- | --- |
| PSL_voltDecreaseLatency PSL_voltIncreaseLatency | specify the maximum latencies incurred during voltage scaling operations. The latency is given in microseconds. Following the initiation of a voltage scaling operation, the latency is the time required before the new voltage has been reached. These latencies are system specific and are measured for each different target board. | const unsigned PSL_voltDecreaseLatency = 3300; // 3.3 milliseconds const unsigned PSL_voltIncreaseLatency = 300; // 300 microseconds |
| PSL_voltRegInitFunc | specifies the function that performs any one-time initialization that may be required before the voltage regulator can perform scaling operations. For the C5510, this variable is initialized to the default initialization routine. | PSL_VoltRegInitFunc PSL_voltRegInitFunc = PSL_gpioVoltRegInit_DSK5510; |
| PSL_voltRegScaleFunc | specifies the function that performs voltage scaling. For the C5510, this variable is initialized to the default scaling routine. | PSL_VoltRegScaleFunc PSL_voltRegScaleFunc = PSL_gpioVoltRegScale_DSK5510; |
| PSL_gpioIodirAddr PSL_gpioIodataAddr | specify the addresses of GPIO IODIR and IODATA registers in I/O space. | const unsigned PSL_gpioIodirAddr = 0x3400; const unsigned PSL_gpioIodataAddr = 0x3401; |
| PSL_gpioPinsMask | a mask that specifies which GPIO pin(s) is/are used to control the voltage regulator. | const unsigned PSL_gpioPinsMask = 0x1; // GPIO bit 0 |
| PSL_GpioVoltRegTable | contains the GPIO bit settings for each voltage supported by the regulator. | PSL_GpioVoltRegTable PSL_gpioVoltRegTable[ ] = { {1.1f, 0x0}, // set GPIO bit 0 to a 0 {1.6f, 0x1}, // set GPIO bit 0 to a 1 }; |

PSL 1008 does not require a specific voltage regulator control scheme. Instead, built-in support for a default control scheme is provided along with a mechanism that allows application developers to override the built-in support with their own implementations. For the C5510, the default support provides for controlling the voltage regulator via the GPIO pins. The presence or absence of the macro USING_DEFAULT_VOLT_REG_CONTROL, defined in PSL-volt_cfg.h, determines whether the default support is used.

If the voltage regulator on the target board is controlled via GPIO pins, the configuration data in PSLvolt_cfg.c permits the application developer to specify the GPIO pin(s) used to control the regulator and the pin values for each voltage. For example, the default values for PSL_gpioPinsMask and PSL_gpioVoltRegTable provided in PSL-volt_cfg.c for the C5510, where the voltage regulator is controlled by GPIO pin 0 and supports two voltage points are shown in Table 25.

TABLE 25

```
const unsigned PSL_gpioPinsMask = 0x1; // GPIO pin 0
PSL_GpioVoltRegTable PSL_gpioVoltRegTable[ ] = {
{1.1f, 0x0}, // set GPIO pin 0 to a 0 for 1.1v
{1.6f, 0x1}, // set GPIO pin 0 to a 1 for 1.6v
};
```

PSL_gpioPinsMask specifies the GPIO pin and PSL_gpioVoltRegTable specifies the value of the GPIO pin for each supported voltage. In this case, the regulator is controlled by a single pin, which is GPIO pin 0. When this pin is driven low, the voltage is changed to 1.1 v. When this pin is driven high, the voltage is changed to 1.6 v.

As another example, consider a case where the voltage regulator is controlled by GPIO pins 0 and 1, and there are four voltage points 0.9 v, 1.1 v, 1.3 v, and 1.6 v. The values for PSL_gpioPinsMask and PSL_gpioVoltRegTable in this instance are shown in Table 26.

TABLE 26

```
const unsigned PSL_gpioPinsMask = 0x3; // GPIO pins 0 and 1
PSL_GpioVoltRegTable PSL_gpioVoltRegTable = {
{0.9f, 0x0}, // set both GPIO pin 0 and 1 to a 0 for 0.9v
{1.1f, 0x1}, // set GPIO pin 0 to a 1 and GPIO pin 1 to a 0 for 1.1v
{1.3f, 0x2}, // set GPIO pin 0 to a 0 and GPIO pin 1 to a 1 for 1.3v
{1.6f, 0x3}, // set both GPIO pin 0 and 1 to a 1 for 1.6v
};
```

An application developer may override the default voltage regulator support with custom support. The configuration data provides function pointers that enable application developers to supply their own voltage regulator control functions. For the C5510, the function pointers refer to the functions that use GPIO pins to control the regulator. The default implementation can be overridden by changing the function pointers to refer to developer-supplied functions. Two functions are required: an initialization function and a scaling function. The initialization function is of type PSL- _VoltRegInitFunc, the definition of which is shown in Table 27. The scaling function is of type PSL_VoltRegScaleFunc, the definition of which is shown in Table 28.

TABLE 27

| | |
|---|---|
| Function | typedef void (* PSL_VoltRegInitFunc)(void); |
| Description | Function that performs any one-time initialization that may be required before the voltage regulator can perform scaling operations. |
| Parameters | none |
| Return Value | none |

TABLE 28

| | | |
|---|---|---|
| Function | typedef void (* PSL_VoltRegScaleFunc)(float currVoltage, | |
| | | float newVoltage, |
| | | float currFrequency, |
| | | int wait); |
| Description | Function that scales the voltage to the specified voltage. If wait is TRUE, wait until the new voltage has been reached. | |
| Parameters | currVoltage [in] | the current voltage. |
| | newVoltage [in] | the new voltage. |
| | currFrequency [in] | the current clock frequency of the device that is executing this routine. The frequency may be needed to implement a delay loop in cases where wait is TRUE and the voltage regulator provides no notification as to when the new voltage has been reached. |
| | wait [in] | TRUE if this routine should wait for the new voltage to reach the regulation point. FALSE otherwise. |
| | Return Value | none |

As mentioned previously, PSL 1008 comprises a standard API for power scaling functionality. The implementation of this functionality may vary based on processor and voltage regulator capabilities but the API remains the same. Table 29 presents a summary of the functions in this API. See the table listed in the table column of Table 29 for a more detailed description of each function. Several types are used in these API functions: PSL_ClkID, PSL_Setpoint, PSL_Status, PSL_PrologueFunc, PSL_EpilogueFunc, and PSL_ClkMode. These types are defined below to aid in understanding the API functions.

PSL_ClkID, illustrated in Table 30, defines the different clocks that are supported by the power scaling library. For the C5510, there is only one clock. Multi-core devices that have more than one clock will define multiple clocks.

TABLE 30 typedef enum {
   PSL_CPU_CLK = 0
} PSL_ClkID;

PSL_Setpoint, defined as typedef unsigned PSL_Setpoint;, is an unsigned integer used to refer to a discrete frequency and voltage operating point, i.e. a setpoint, that is supported by the PSL. The voltage of a setpoint is the minimum operating voltage that is required to support the frequency of the setpoint. All scaling operations are performed on setpoints. Each clock supported by the scaling library has a separate set of setpoints. The number of setpoints associated with a specific clock corresponds directly to the number of entries in the clock's frequency table. The ordering of the setpoints also corresponds directly

TABLE 29

| Function | Description | Table |
|---|---|---|
| PSL_initialize | Initializes the power scaling library | 35 |
| PSL_getNumSetpoints | Returns the number of valid setpoints for the specified clocks. | 36 |
| PSL_getSetpoints | Returns the current setpoint for each of the specified clocks. | 37 |
| PSL_changeSetpoints | For each of the specified clocks, initiates a scaling operation to the new setpoint. This includes setting the CPU clock frequency and clock mode, and possibly the voltage to those specified by the clock's new setpoint. | 38 |
| PSL_querySetpoints | Returns the clock frequency, clock mode, and voltage that are associated with each of the specified setpoints. | 39 |
| PSL_querySetpointFrequencies | Returns the clock frequency that is associated with each of the specified set points. | 40 |
| PSL_querySetpointVoltages | Returns the voltage that is associated with each of the specified setpoints. | 41 |
| PSL_querySetpointModes | Returns the clock mode that is associated with each of the specified setpoints. | 42 |
| PSL_querySetpointTransitions | Returns the maximum scaling latencies that are associated with each of the specified setpoint changes. | 43 |
| PSL_getFrequencies | Returns the current clock frequency for each of the specified clocks. | 44 |
| PSL_getModes | Returns the current clock mode (e.g. PSL_BYPASS or PSL_LOCK) for each of the specified clocks. | 45 |
| PSL_getVoltage | Return the current voltage. | 46 | to the ordering specified by the frequency table. For the C5510 device, the scaling library supports one clock, which is referred to as PSL_CPU_CLK. Thus, the C5510 device has only one set of setpoints.

PSL_Status, illustrated in Table 31, specifies the return status of several scaling functions. If the return status is PSL_OK, the function executed without error. A return value other than PSL_OK indicates that the function encountered an error during execution.

TABLE 31

```
typedef enum {
    PSL_OK,
    PSL_INVALID_CLK,
    PSL_INVALID_FREQ,
    PSL_INVALID_INITIAL_FREQ,
    PSL_INVALID_INITIAL_VOLTAGE,
    PSL_INVALID_SETPOINT,
    PSL_MAX_FREQ_EXCEEDED,
    PSL_MAX_VOLTAGE_EXCEEDED,
    PSL_INCOMPATIBLE_VOLTAGE,
    PSL_INCOMPLETE_INITIALIZATION,
    PSL_CANNOT_CHANGE_SETPOINT
} PSL_Status;
```

PSL_PrologueFunc, illustrated in Table 32, is a pointer to a function that is called immediately before a scaling operation (i.e., immediately before a setpoint change). This callback allows applications to perform any peripheral modifications required prior to the upcoming scaling operation. For example, the application may need to stop a timer prior to changing the clock frequency.

TABLE 32

```
typedef void (* PSL_PrologueFunc)(unsigned count,
                                  PSL_ClkID *clks,
                                  PSL_Setpoint *currentSetpoints,
                                  PSL_Setpoint *newSetpoints);
```

PSL_EpilogueFunc, illustrated in Table 33, is a pointer to a function that is called immediately after a scaling operation, i.e., immediately after a setpoint change. This callback allows an application to perform any peripheral modifications required as a result of the just completed scaling operation. For example, the application may need to reprogram and restart a timer after changing the clock frequency.

TABLE 33

```
typedef void (* PSL_EpilogueFunc)(unsigned count,
                                  PSL_ClkID *clks,
                                  PSL_Setpoint *oldSetpoints,
                                  PSL_Setpoint *currentSetpoints);
```

PSL_ClkMode, illustrated in Table 34, specified the different operating modes of the CPU clock. The clock on C5510 devices can operate in either bypass or lock mode.

TABLE 34

```
typedef enum { // clock's operating mode
    PSL_BYPASS,
    PSL_LOCK
} PSL_ClkMode;
```

TABLE 35

| | | | |
|---|---|---|---|
| Function | PSL_Status PSL_initialize(unsigned | count, | |
| | | PSL_ClkID | *clks, |
| | | unsigned | *initFrequencies, |
| | | float | initVoltage) |
| Description | Perform any initialization required by the power scaling library. The initial clock frequency and operating mode for each clock are determined according to the values specified in the initFrequencies array. The values in this array are indices into a clock's associated frequency table. This routine does not actually change the frequency of any clock. Instead, it assumes that a clock's initial frequency is also the clock's current frequency. An initial frequency must be supplied for every clock that is defined by the enum type PSL_ClkID. The initial voltage is specified by initVoltage. This routine does not actually change the voltage. Instead, it assumes that the initial voltage is also the current voltage. The initial voltage must match one of the voltages specified in the voltage table. The initial setpoint for each clock will specify the clock's initial frequency and the minimum voltage required for that frequency. | | |
| Parameters | count [in] | Specifies the number of clocks pointed to by clks. The count must specify the number of clocks defined by the enum type PSL_ClkID. | |
| | *clks [in] | Pointer to locations that specify the clocks. The number of clocks referred to by the pointer should match the count. Every clock that is defined by the enum type PSL_ClkID must be present in the array. | |
| | *initFrequencies [in] | Pointer to locations that specify the initial frequency of each clock. The values in this array are indexes into a clock's associated frequency table. The initial frequency for clks[0] is specified by initFrequencies[0], the initial frequency for clks[1] is specified by initFrequencies[1],etc. | |
| | initVoltage [in] | The initial voltage. | |
| Return Value | PSL_OK | | If all initialization required for the correct operation of the scaling library succeeds. If initialization does not succeed, all setpoints for all clocks are considered invalid |
| | PSL_INVALID_CLK | | If any of the specified clocks are invalid. |
| | PSL_INVALID_FREQ | | If any of the clock frequencies tables are empty, there are more than 16 entries in any of the frequencies tables, or any of the values (mult, |

TABLE 35-continued

| | | |
|---|---|---|
| | | div, mode) for a specific clock are invalid. |
| | PSL_INVALID_INITIAL_FREQ | If any of the values specified in the initFrequencies array are invalid indexes into the corresponding clock's frequency table. |
| | PSL_MAX_FREQ_EXCEEDED | If any of the frequencies specified in a clock'sfrequency table exceed the maximum operating frequency of the device that the clock is controlling. |
| | PSL_INCOMPATIBLE_VOLTAGE | If the initial voltage as specified by initVoltage is less than the voltage required by any of the initial setpoints. |
| | PSL_INVALID_INITIAL_VOLTAGE | If the intial voltage as specified by initVoltage is not one of the voltages specified in the voltage table. |
| | PSL_MAX_VOLTAGE_EXCEEDED | If any of the values in the user configurable data are beyond the maximum supported voltage. |
| | PSL_INCOMPLETE_INITIALIZATION | If an initial frequency is not supplied for every clock defined by the enum type PSL_ClkID. |

TABLE 36

| | | |
|---|---|---|
| Function | PSL_Status PSL_getNumSetpoints(unsigned | count, |
| | PSL_ClkID | *clks, |
| | unsigned | *numSetpoints) |
| Description | This function returns the number of valid setpoints for the specified clocks. If a clock has n valid setpoints, the valid setpoints for that clock are those in the range (0 . . . □n−1). No setpoint for any clock is considered valid until the power scaling library has been successfully initialized. | |
| Parameters | count [in] | Specifies the number of clocks pointed to by clks. |
| | *clks [in] | Pointer to locations that specify the clocks. The number of clocks referred to by the pointer should match the count. |
| | *numSetpoints [out] | Pointer to locations to store the setpoint count for each of the clocks referred to by the clks pointer. The number of valid setpoints for clks[0] will be returned in numSetpoints[0], the valid number of setpoints for clks[1] will be returned in numSetpoints[1], etc. |
| Return Value | PSL_OK | If all of the specified clocks are valid. |
| | PSL_INVALID_CLK | If any of the specified clocks are invalid. |

TABLE 37

| | | |
|---|---|---|
| Function | PSL_Status PSL_getSetpoints(unsigned | count, |
| | PSL_ClkID | *clks, |
| | PSL_Setpoint | *setpoints) |
| Description | This function returns the current setpoint for each of the specified clocks. | |
| Parameters | count [in] | Specifies the number of clocks pointed to by clks. |
| | *clks [in] | Pointer to locations that specify the clocks. The number of clocks referred to by the pointer should match the count. |
| | *setpoints [out] | Pointer to locations to store the current setpoint for each of the clocks referred to by the clks pointer. The current setpoint for clks[0] will be returned in setpoints[0], the current setpoint for clks[1] will be returned in setpoints[1], etc. |
| Return Value | PSL_OK | If all of the specified clocks are valid. |
| | PSL_INVALID_CLK | If any of the specified clocks are invalid. |

TABLE 38

| | | |
|---|---|---|
| Function | PSL_Status PSL_changeSetpoints(unsigned count, | |
| | PSL_ClkID | *clks, |
| | PSL_Setpoint | *newSetpoints, |
| | int | scaleVoltage, |
| | int | waitForVoltScale, |
| | PSL_PrologueFunc prologueFunc, | |
| | PSL_EpilogueFunc epilogueFunc) | |
| Description | For each of the specified clocks, this function initiates a scaling operation to the new setpoint. This includes setting the CPU clock frequency and clock mode to those specified by the clock's new setpoint. If scaleVoltage is TRUE and the current voltage is not sufficient for any of the new setpoints, then the voltage will be increased to the lowest level that will support all the new setpoints. In this case, the new voltage will also be sufficient for any current setpoint that is not being changed. If a lower voltage is sufficient for all new setpoints as well as all current | |

TABLE 38-continued

|   |   |   |
|---|---|---|
| | | setpoints that are not being changed, the voltage will be decreased to the lowest level that will support all of these setpoints.<br>This routine will not return until the clocks are generating the new frequencies specified by the setpoints. If waitForVoltScale is TRUE and the voltage was actually scaled, then this routine will also wait until the new voltage is reached. In addition, if a voltage increase was required as part of the setpoint changes, or if the device is in an unstable state until the new voltage is reached, then this routine will also wait for the voltage scaling to complete, regardless of waitForVoltScale.<br>Prior to initiating any scaling operations, this routine will call the function referenced by prologueFunc. If prologueFunc is NULL, no function is called. Similarly, following the scaling operations, this routine will call the function referred to by epilogueFunc. The call to epilogueFunc will not occur until the clocks are generating the new frequencies. If this routine must wait for the new voltage to be reached, then the call to epilogueFunc will not occur until the voltage has been reached. If epilogueFunc is NULL, no function is called. |
| Parameters | count [in] | Specifies the number of clocks pointed to by clks. |
| | *clks [in] | Pointer to locations that specify the clocks. The number of clocks referred to by the pointer should match the count. |
| | *newSetpoints [in] | Pointer to locations that specify the new setpoint for each of the clocks referred to by the clks pointer. The new setpoint for clks[0] is specified by newSetpoints[0], the new setpoint for clks[1] is specified by newSetpoints[1], etc. |
| | scaleVoltage [in] | TRUE if the voltage should be scaled when necessary. FALSE if the voltage should not be scaled. |
| | WaitForVoltScale [in] | TRUE if this routine should wait for the new voltage to be reached after initiating the voltage scaling. FALSE if waiting is not required. Note that this parameter is ignored if a voltage increase is required or if the device is in an unstable state until the new voltage is reached. In these cases, this routine will always wait for the voltage scaling to complete. |
| | prologueFunc [in] | Function called prior to scaling operations. NULL if no function is to be called. |
| | epilogueFunc [in] | Function called after the scaling operations have completed. NULL if no function is to be called. |
| Return Value | PSL_OK | If the setpoint changes were successful. |
| | PSL_INVALID_CLK | If any of the specified clocks are invalid. |
| | PSL_INVALID_SETPOINT | If any of the new setpoints are invalid. A clock's valid setpoints are those in the range (0 . . . n−1), where n is the number of valid setpoints returned by PSL_getNumSetpoints( ). No scaling operations are performed if any of the setpoints are invalid. |
| | PSL_INCOMPATIBLE_VOLTAGE | If scaleVoltage is FALSE and the current voltage is less than the voltage required by any of the new setpoints. No scaling operations are performed in this case. |
| | PSL_CANNOT_CHANGE_SETPOINT | If the setpoint could not be changed. |

TABLE 39

|   |   |   |   |
|---|---|---|---|
| Function | PSL_Status PSL_querySetpoints(unsigned | | count, |
| | | PSL_ClkID | *clks, |
| | | PSL_Setpoint | *setpoints, |
| | | float | *frequencies, |
| | | float | *voltages, |
| | | PSL_ClkMode | *modes) |
| Description | This function returns the clock frequency, clock mode, and voltage that are associated with each of the specified setpoints. | | |
| Parameters | count [in] | Specifies the number of clocks pointed to by clks. | |
| | *clks [in] | Pointer to locations that specify the clocks. The number of clocks referred to by the pointer should match the count. | |
| | *setpoints [in] | Pointer to locations that specify the setpoints that are being queried. The setpoint for clks[0] is specified by setpoints[0], the setpoint for clks[1] is specified by setpoints[1], etc. | |
| | *frequencies [out] | Pointer to locations to store the frequency associated with each setpoint. The frequency for setpoints[0] will be returned in frequencies[0], the frequency for setpoints[1] will be returned in frequencies[1], etc. | |
| | *voltages [out] | Pointer to locations to store the voltages associated with each setpoint. A setpoint's voltage is the minimum voltage required for the setpoint's frequency. Note that this voltage may not be equal to the current voltage if voltage scaling was not performed during PSL_changeSetpoint, or if the current setpoint for another clock required a higher | |

TABLE 39-continued

|  |  |  |
|---|---|---|
|  |  | voltage. The voltage for setpoints[0] will be returned in voltages[0], the voltage for setpoints[1] will be returned in voltages[1], etc. |
|  | *modes [out] | Pointer to locations to store the clock mode associated with each setpoint (e.g. PSL_BYPASS or PSL_LOCK). The clock mode for setpoints[0] will be returned in modes[0], the clock mode for setpoints[1] will be returned in modes[1], etc. |
| Return Value | PSL_OK | If the specified clocks and setpoints are valid. |
|  | PSL_INVALID_CLK | If any of the specified clocks are invalid. |
|  | PSL_INVALID_SETPOINT | If any of the setpoints are invalid. A clock's valid setpoints are those in the range 0–n–1, where n is the number of valid setpoints returned by PSL_getNumSetpoints( ). |

TABLE 40

| Function | PSL_Status PSL_querySetpointFrequencies(unsigned count, PSL_ClkID *clks, PSL_Setpoint *setpoints, float *frequencies) | |
|---|---|---|
| Description | This function returns the clock frequency that is associated with each of the specified setpoints. | |
| Parameters | count [in] | Specifies the number of clocks pointed to by clks. |
|  | *clks [in] | Pointer to locations that specify the clocks. The number of clocks referred to by the pointer should match the count. |
|  | *setpoints [in] | Pointer to locations that specify the setpoints that are being queried. The setpoint for clks[0] is specified by setpoints[0], the setpoint for clks[1] is specified by setpoints[1], etc. |
|  | *frequencies [out] | Pointer to locations to store the frequency associated with each setpoint. The frequency for setpoints[0] will be returned in frequencies[0], the frequency for setpoints[1] will be returned in frequencies[1], etc. |
| Return Value | PSL_OK | If the specified clocks and setpoints are valid. |
|  | PSL_INVALID_CLK | If any of the specified clocks are invalid. |
|  | PSL_INVALID_SETPOINT | If any of the setpoints are invalid. A clock's valid setpoints are those in the range 0 . . . n–1, where n is the number of valid setpoints returned by PSL_getNumSetpoints( ). |

TABLE 41

| Function | PSL_Status PSL_querySetpointVoltages(unsigned count, PSL_ClkID *clks, PSL_Setpoint *setpoints, float *voltages) | |
|---|---|---|
| Description | This function returns the voltage that is associated with each of the specified setpoints. | |
| Parameters | count [in] | Specifies the number of clocks pointed to by clks. |
|  | *clks [in] | Pointer to locations that specify the clocks. The number of clocks referred to by the pointer should match the count. |
|  | *setpoints [in] | Pointer to locations that specify the setpoints that are being queried. The setpoint for clks[0] is specified by setpoints[0], the setpoint for clks[1] is specified by setpoints[1], etc. |
|  | *voltages [out] | Pointer to locations to store the voltages associated with each setpoint. A setpoint's voltage is the minimum voltage required for the setpoint's frequency. Note that this voltage may not be equal to the current voltage if voltage scaling was not performed during PSL_changeSetpoint, or if the current setpoint for another clock required a higher voltage. The voltage for setpoints[0] will be returned in voltages[0], the voltage for setpoints[1] will be returned in voltages[1], etc. |
| Return Value | PSL_OK | If the specified clocks and setpoints are valid. |
|  | PSL_INVALID_CLK | If any of the specified clocks are invalid. |
|  | PSL_INVALID_SETPOINT | If any of the setpoints are invalid. A clock's valid setpoints are those in the range 0 □ n–1, where n is the number of valid setpoints returned by PSL_getNumSetpoints( ). |

TABLE 42

| Function | PSL_Status PSL_querySetpointModes(unsigned count, PSL_ClkID *clks, PSL_Setpoint *setpoints, PSL_ClkMode *modes) | |
|---|---|---|
| Description | This function returns the clock mode that is associated with each of the specified setpoints. | |
| Parameters | count [in] | Specifies the number of clocks pointed to by clks. |
| | *clks [in] | Pointer to locations that specify the clocks. The number of clocks referred to by the pointer should match the count. |
| | *setpoints [in] | Pointer to locations that specify the setpoints that are being queried. The setpoint for clks[0] is specified by setpoints[0], the setpoint for clks[1] is specified by setpoints[1], etc. |
| | *modes [out] | Pointer to locations to store the clock mode associated with each setpoint (e.g. PSL_BYPASS or PSL_LOCK). The clock mode for setpoints[0] will be returned in modes[0], the clock mode for setpoints[1] will be returned in modes[1], etc. |
| Return Value | PSL_OK | If the specified clocks and setpoints are valid. |
| | PSL_INVALID_CLK | If any of the specified clocks are invalid. |
| | PSL_INVALID_SETPOINT | If any of the setpoints are invalid. A clock's valid setpoints are those in the range 0 . . . n−1, where n is the number of valid setpoints returned by PSL_getNumSetpoints( ). |

TABLE 43

| Function | PSL_Status PSL_querySetpointTransitions(unsigned count, PSL_ClkID *clks, PSL_Setpoint *fromSetpoints, PSL_Setpoint *toSetpoints, unsigned *freqScalingLatencies, unsigned *voltageScalingLatency) | |
|---|---|---|
| Description | This function returns the maximum scaling latencies that are associated with each of the specified setpoints changes. | |
| Parameters | count | Specifies the number of clocks pointed to by clks. |
| | *clks [in] | Pointer to locations that specify the clocks. The number of clocks referred to by the pointer should match the count. |
| | *fromSetpoints [in] | Pointer to locations that specify the source setpoints. The source setpoint for clks[0] is specified by fromSetpoints[0], the source setpoint for clks[1] is specified by fromSetpoints[1], etc. |
| | *toSetpoints [in] | Pointer to locations that specify the destination Setpoints. The destination setpoint for clks[0] is specified by toSetpoints[0], the destination setpoint for clks[1] is specified by toSetpoints[1], etc. |
| | *freqScalingLatencies [out] | Pointer to locations to store the maximum latencies associated with each of the frequency scaling operations that will occur during the specified setpoint changes. The latencies are specified in microseconds. Following the initiation of a frequency scaling operation, the latency is the time required before the clock starts generating the new frequency. The latency for the setpoint change associated with clks[0] is specified by freqScalingLatencies[0], the latency for the setpoint change associated with clks[1] is specified by freqScalingLatencies[1], etc. |
| | *voltageScalingLatency [out] | Location to store the maximum latency associated with the voltage scaling that may occur during the specified setpoint changes. The latency is given in microseconds. Following the initiation of the voltage scaling operation, the latency is the time required before the new voltage has been reached. |
| Return Value | PSL_OK | If the specified clocks and setpoints are valid. |
| | PSL_INVALID_CLK | If any of the specified clocks are invalid. |
| | PSL_INVALID_SETPOINT | If any of the setpoints are invalid. A clock's valid setpoints are those in the range (0 . . . n−1), where n is the number of valid setpoints returned by PSL_getNumSetpoints( ). |

TABLE 44

| Function | PSL_Status PSL_getFrequencies(unsigned count, PSL_ClkID *clks, float *frequencies) |
|---|---|
| Description | This function returns the current clock frequency for each of the specified clocks. |

TABLE 44-continued

| | | |
|---|---|---|
| Parameters | count [in] | Specifies the number of clocks pointed to by clks. |
| | *clks [in] | Pointer to locations that specify the clocks. The number of clocks referred to by the pointer should match the count. |
| | *frequencies [out] | Pointer to locations to store the current frequency of each of the specified clocks. The current frequency of a clock is the same as the frequency returned by PSL_querySetpointFrequencies for that clock when that function is called with the clock's current setpoint (i.e., the current frequency of a clock is always the same as the frequency of the clock's current setpoint). The current frequency for clks[0] will be returned in frequencies[0], the current frequency for clks[1] will be returned in frequencies[1], etc. |
| Return Value | PSL_OK | If all of the specified clocks are valid. |
| | PSL_INVALID_CLK | If any of the specified clocks are invalid. |

TABLE 45

| | | |
|---|---|---|
| Function | PSL_Status PSL_getModes(unsigned count, PSL_ClkID *clks, PSL_ClkMode *modes) | |
| Description | This function returns the current clock mode (e.g., PSL_BYPASS or PSL_LOCK) for each of the specified clocks. | |
| Parameters | count [in] | Specifies the number of clocks pointed to by clks. |
| | *clks [in] | Pointer to locations that specify the clocks. The number of clocks referred to by the pointer should match the count. |
| | *modes [out] | Pointer to locations to store the current mode of each of the specified clocks. The current operating mode of a clock is the same as the mode returned by PSL_querySetpointModes when that function is called with the clock's current setpoint (i.e., the current mode of a clock is always the same as the mode of the clock's current setpoint). The current mode for clks[0] will be returned in modes[0], the current mode for clks[1] will be returned in modes[1], etc. |
| Return Value | PSL_OK | If all of the specified clocks are valid. |
| | PSL_INVALID_CLK | If any of the specified clocks are invalid. |

TABLE 46

| | | |
|---|---|---|
| Function | float PSL_getVoltage( ) | |
| Description | This function returns the current voltage. | |
| Return Value | This function returns the current voltage. If voltage scaling was not performed in any of the calls to PSL_changeSetpoint, the current voltage is assumed to be the initial voltage as specified in the user configurable data. If voltage scaling is being done, the current voltage will be the lowest voltage that is sufficient for all of the current setpoints. | |

By default, PSL 1008 performs many error checks that prevent the device from running at unsupported frequencies and voltages and unsupported frequency/voltage combinations. These checks guard against situations such as over-clocking and other situations that could cause damage to the device. However, these error checks do increase the code size. For this reason, separate libraries that do not contain these error checks are provided for the application developer to use in the delivered application to decrease the code size. These libraries do not check for the following errors: PSL_INVALID_CLK, PSL_INVALID_FREQ, PSL_INVALID_INITIAL_FREQ, PSL_INVALID_INITIAL_VOLTAGE, PSL_INVALID_SETPOINT, PSL_MAX_FREQ_EXCEEDED, PSL_MAX_VOLTAGE_EXCEEDED, PSL_INCOMPATIBLE_VOLTAGE, and PSL_INCOMPLETE_INITIALIZATION. Generally, initial development is done using the default libraries that contain the error checks and a switch is made to the library implementation that perform no error checking after the developer has ensured these errors will not occur.

Tables 48, 51, and 53 contain examples of the use of this embodiment of the scaling functionality. These examples assume that the configuration library is built using the configuration data shown in Table 47. All examples assume that the initial frequency and voltage at system startup are 200 MHz and 1.6 v respectively. The call to scaling library API initialization routine specifies these initial settings. The initial frequency is specified by supplying an index to an entry in PSL_cpuFreqTable[]. In the configuration data shown in Table 47, 200 MHz is entry 15 in the table.

TABLE 47

```
const float PSL_cpuInputFreq = 24.0f; // 24 MHz input clock (CLKIN) frequency
const float PSL_cpuMaxFreq = 200.0f; // 200 MHz max operating frequency
PSL_CPUFreq PSL_cpuFreqTable = {
  {0, 0, 3, PSL_BYPASS}, // 6 MHz (input freq / 4), bypass mode
  {0, 0, 1, PSL_BYPASS}, // 12 MHz (input freq / 2), bypass mode
  {0, 0, 0, PSL_BYPASS}, // 24 MHz (input freq / 1), bypass mode
  {2, 0, 0, PSL_LOCK}, // 48 MHz (input freq * (2 / 1)), lock mode
  {5, 1, 0, PSL_LOCK}, // 60 MHz (input freq * (5 / 2)), lock mode
  {3, 0, 0, PSL_LOCK}, // 72 MHz (input freq * (3 / 1)), lock mode
  {7, 1, 0, PSL_LOCK}, // 84 MHz (input freq * (7 / 2)), lock mode
  {4, 0, 0, PSL_LOCK}, // 96 MHz (input freq * (4 / 1)), lock mode
  {9, 1, 0, PSL_LOCK}, //108 MHz (input freq * (9 / 2)), lock mode
  {5, 0, 0, PSL_LOCK}, //120 MHz (input freq * (5 / 1)), lock mode
  {11, 1, 0, PSL_LOCK}, //132 MHz (input freq * (11 / 2)), lock mode
  {6, 0, 0, PSL_LOCK}, //144 MHz (input_freq * (6 / 1)), lock mode
  {13, 1, 0, PSL_LOCK}, //156 MHz (input freq * (13 / 2)), lock mode
  {7, 0, 0, PSL_LOCK}, //168 MHz (input_freq * (7 / 1)), lock mode
  {15, 1, 0, PSL_LOCK}, //180 MHz (input freq * (15 / 2)), lock mode
  {25, 2, 0, PSL_LOCK}, //200 MHz (input_freq * (25 / 3)), lock mode
};
PSL_VoltTable PSL_voltTable[ ] = {
  {1.1f, 100.0f}, // 0 MHz up to, and including 100 MHz, can use the
```

TABLE 47-continued

```
     // lowest supported voltage of 1.1V.
     {1.6f, 200.0f}, // frequencies > 100 MHz up to the max frequency
                 // require a minimum voltage of 1.6V.
};
```

The example in Table 48 highlights some of the basic scaling library operations. It shows how the scaling functionality is initialized, and how frequency and voltage changes are initiated by the changing of a setpoint. This example calls three functions: func1, func2, and func3 and executes func1 and func3 at 200 MHz and 1.6 v. It executes func2 at 72 MHz and 1.1 v.

TABLE 48

```
#include "PSL.h"
extern void func1( );
extern void func2( );
extern void func3( );
void main (void)
{
    PSL_Status status;
    // Variable specifying PSL_ClkID that will be used in all calls.
    PSL_ClkID clk = PSL_CPU_CLK;
    // Index into PSL_cpuFreqTable[ ] that specifies
    initial freq of 200 MHz.
    unsigned initFreqIndex = 15;
    // PSL_cpuFreqTable[5] represents 72 MHz
    // PSL_cpuFreqTable[15] represent 200 MHz
    PSL_Setpoint_72MHzSetpoint = 5;
    PSL_Setpoint_200MHzSetpoint = 15;
    // Initialize the scaling library. The frequency following reset is
    // specified by PSL_cpuFreqTable[15]. The voltage following
    reset is 1.6 v.
    status = PSL_initialize(1, &clk, &initFreqIndex, 1.6f);
    if (status != PSL_OK)
    {
        // handle error;
        ...
        return;
    }
    // Execute func1 at 200 MHz (i.e., the initial frequency)
    func1( );
    //Change frequency to 72 MHz
    status = PSL_changeSetpoints(1,
                        &clk,
                        &__72MHzSetpoint,
                        TRUE, // change
                        voltage also
                        FALSE,
                        NULL, NULL);
    if (status != PSL_OK) {
        // handle error
        ...
        return;
    }
    // Execute func2 at 72 MHz
    func2( );
    // Change frequency back to 200 MHz
    status = PSL_changeSetpoints(1,
                        &clk,
                        &__200MHzSetpoint,
                        TRUE, // change
                        voltage also
                        FALSE,
                        NULL, NULL);
    if (status != PSL_OK) {
        // handle error
        ...
        return;
    }
    // Execute func3 at 200 MHz
    func3( );
}
```

When the required frequencies are statically known, as is the case in the example of Table 48, the setpoints can be assigned values that correspond to indexes into PSL_cpuFreqTable[]. This is possible because the ordering of the setpoints directly matches the ordering of the frequencies in PSL_cpuFreqTable[]. Therefore, locating the setpoint that corresponds to a particular frequency does not require calls to the query routines in this case. For example, the setpoint __72MhzSetpoint is assigned the value 5 since PSL_cpuFreqTable[5] corresponds to 72 MHz. Similarly, the setpoint __200MhzSetpoint is assigned the value 15, which corresponds to the frequency specified by PSL_cpuFreqTable[15].

Separate calls are not required to change both the frequency and the voltage. Instead, applications initiate a frequency, and possibly a voltage change, through a single call to PSL_changeSetpoints. If an application instructs PSL_changeSetpoints to change the voltage, the voltage will be changed automatically to the voltage specified by the setpoint. This voltage will be the lowest voltage that is required to support the new frequency. In the example of Table 48, the initial frequency is 200 MHz and 1.6 v. When the frequency is changed to 72 MHz, the voltage is automatically changed to 1.1 v by the scaling library. Similarly, when the frequency is changed back to 200 MHz, the scaling library will automatically increase the voltage to 1.6 v.

The scaling library can operate in a mode that changes frequency only. This mode is useful if the target board does not have a voltage regulation capability. The fourth parameter of PSL_changeSetpoints specifies whether voltage scaling should be done. So for the example of Table 48, if the call of Table 49 is used to change the frequency to 72 MHz, the frequency is changed to 72 MHz, but the voltage remains at 1.6 v.

TABLE 49

```
status = PSL_changeSetpoints(1,
                    &clk,
                    &__72MHzSetpoint,
                    FALSE, // do not change voltage
                    FALSE,
                    NULL, NULL);
```

A very important feature of PSL 1008 is that it will always maintain a valid frequency/voltage setting. In the example of Table 48, the scaling library would not allow the application to enter a state where the frequency is 200 MHz and the voltage is 1.1 v. For example, if the second call to PSL_changeSetpoints is that shown in Table 50, the return status will be PSL_INCOMPATIBLE_VOLTAGE and no scaling operations are performed. This is because the frequency/voltage setting at the point of the call is 72 MHz and 1.1 v. The call of Table 50 instructs the scaling library to increase the frequency to 200 MHz and leave the current voltage of 1.1 v unchanged. However, since 200 MHz requires 1.6 v, the scaling library will not perform the frequency change and will return an error.

TABLE 50

```
status = PSL_changeSetpoints(1,
                    &clk,
                    &__200MHzSetpoint,
                    FALSE, // do not change voltage
                    FALSE,
                    NULL, NULL);
```

When changing the frequency, the effects that the frequency change will have on the rest of the system must be considered. Obviously, frequency changes may affect the amount of time it takes to complete a certain operation. Therefore, frequency changes can only occur if the application's timing requirements continue to be satisfied. Frequency changes can also effect the operation of peripherals. For example, the timer period or the EMIF may need to be reprogrammed as a result of a frequency change.

The example of Table 51 illustrates how to use the callback hooks of PSL 1008 to perform peripheral modifications required as a result of an upcoming or just completed scaling operation. In this example, a function of type PSL_PrologueFunc is used to stop Timer0 immediately before the scaling operation. A function of type PSL_EpilogueFunc is used to reprogram and restart Timer0 when the scaling operation completes.

TABLE 51

```
#include "PSL.h"
TIMER_Handle timer0Handle;
//-
// Function to stop the timer. Called immediately before a
// scaling operation is initiated.
//-
void StopTimer0(unsigned      count,
            PSL_ClkID   *clks,
            PSL_Setpoint *currentSetpoints,
            PSL_Setpoint *newSetpoints) {
    TIMER_stop(timer0Handle);
}
//-
// Function to reprogram and restart the timer. Called immediately
// after a scaling operation completes.
// Assumes that Timer0 is already stopped
//-
void RestartTimer0(unsigned     count,
            PSL_ClkID    *clks,
            PSL_Setpoint *oldSetpoints,
            PSL_Setpoint *currentSetpoints) {
    float currFreq;
    unsigned long cycles;
    Uint16 timer0TCR;
    // Set timer loading (TLB) bit prior to initializing the period
    // and prescale registers.
    timer0TCR = TIMER_RGETH(timer0Handle, TCR);
    timer0TCR |= TIMER_FMK(TCR,TLB,1); // TLB = 1;
    TIMER_RSETH(timer0Handle, TCR, timer0TCR);
    // Reprogram the period and prescale register such that the
    // interrupt period is 10 microseconds. The actual number of
    // CPU cycles is determined based on the current CPU frequency.
    PSL_querySetpointFrequencies(1, clks, currentSetpoints, &currFreq);
    cycles = (unsigned long)(10.0f * currFreq);
    // Write PRD register
    TIMER_FSETH(timer0Handle, PRD, PRD, cycles & 0xFFFF);
    // Write TDDR field of PRSC register
    TIMER_FSETH(timer0Handle, PRSC, TDDR, (cycles >> 16) & 0xF);
    // Restart the timer
    TIMER_start(timer0Handle);
}
#include "PSL.h"
extern void func1( );
extern void func2( );
extern void func3( );
void main (void)
{
    PSL_Status status;
    // Variable specifying PSL_ClkID that will be used in all PSL calls.
    PSL_ClkID clk = PSL_CPU_CLK;
    // Index into PSL_cpuFreqTable[ ] that specifies initial
    freq of 200 MHz.
    unsigned initFreqIndex = 15;
    // PSL_cpuFreqTable[5] represents 72 MHz
    // PSL_cpuFreqTable[15] represent 200 MHz
    PSL_Setpoint_72MHzSetpoint = 5;
    PSL_Setpoint_200MHzSetpoint = 15;
```

TABLE 51-continued

```
    // Initialize the PSL. The frequency following reset is
    // specified by PSL_cpuFreqTable[15]. The voltage following
    reset is 1.6 v.
    status = PSL_initialize(1, &clk, &initFreqIndex, 1.6f);
    if (status != PSL_OK)
    {
        // handle error;
        ...
        return;
    }
    // Execute func1 at 200 MHz (i.e., the initial frequency)
    func1( );
    //Change frequency to 72 MHz. Stop/Restart the Timer before/after the
    // scaling operation.
    status = PSL_changeSetpoints(1,
                    &clk,
                    &_72MHzSetpoint,
                    TRUE, // change voltage also
                    FALSE,
                    StopTimer0, // Stop timer before
                    scaling operation
                    RestartTimer0); // Reprogram and
                    start timer after scaling
    if (status != PSL_OK) {
        // handle error
        ..
        return;
    }
    // Execute func2 at 72 MHz
    func2( );
    // Change frequency to 200 MHz. Stop/Restart the Timer before/after
    // the scaling operation.
    status = PSL_changeSetpoints(1,
                    &clk,
                    &_200MHzSetpoint,
                    TRUE, // change voltage also
                    FALSE,
                    StopTimer0, // Stop timer before
                    scaling operation
                    RestartTimer0); // Reprogram and
                    start timer after scaling
    if (status != PSL_OK) {
        // handle error
        ..
        return;
    }
    // Execute func3 at 200 MHz;
    func3( );
}
```

The prologue and epilogue functions are passed to the scaling library as the last two parameters of PSL_changeSetpoints. In the example of Table 51, StopTimer0, the prologue function, is called immediately before the scaling operation is initiated. RestartTimer0, the epilogue function, is called immediately after the scaling has completed. The prologue function is passed the current and new setpoints, and the epilogue function is passed the old and current setpoints. Since the StopTimer0 function simply stops the timer, it does not use these parameters. However, the RestartTimer0 function determines the frequency of the current setpoint so that the period register of the timer can be reprogrammed correctly.

The example of Table 51 handles only one peripheral. Multiple peripherals can be handled by supplying a wrapper function that calls other routines to adjust the peripherals as necessary. For example, an epilogue function that restarts Timer0 and reprograms the EMIF might resemble the code in Table 52.

TABLE 52

```
void EpilogueFunc (unsigned count,
                   PSL_ClkID    *clks,
                   PSL_Setpoint *oldSetpoints,
                   PSL_Setpoint *currentSetpoints) {
    // Determine frequency of current setpoint
    float freq;
    PSL_getSetPointFrequencies(1, clks, currSetpoints, &freq);
    // Reprogram and restart Timer1 based on the current frequency
    RestartTimer0(freq);
    // Reprogram EMIF based on current frequency
    ReprogramEMIF(freq);
}
```

In the examples of Table 48 and Table 51, the desired frequencies are statically known. In both instances, the application switches between 200 MHz and 72 MHz. Since the frequencies are known up front, the setpoints may be directly assigned values that corresponded to indices into the frequency table PSL_cpuFreqTable[]. However, there may be cases where the frequency is to be dynamically determined. Consider an application that dynamically determines the lowest possible frequency based on information relating to the system's timing requirements and the timing information of each task or operation. In this case, after calculating the lowest possible frequency, the application must determine the setpoint that corresponds to the closest frequency that is greater than or equal to the calculated frequency. For example, assuming the configuration data of Table 47, if the calculated frequency is 70 MHz, the setpoint that corresponds to 72 MHz must be used since there is no setpoint that corresponds to 70 MHz. In the example of Table 53, the function FindSetpoint illustrates how to find the correct setpoint by using the query routines of the scaling library API. The function ChangeToLowestFreq further illustrates how query functions can be used.

TABLE 53

```
//-----
// Function to find a setpoint that corresponds to the closest frequency
// that is greater than or equal to the specified frequency.
//-----
PSL_Setpoint FindSetpoint (float desiredFreq)
{
    unsigned i, numSetpoints;
    float freq,
    float closetFreq = PSL_cpuMaxFreq;
    PSL_Setpoint closestSetPoint;
    // Determine number of setpoints
    PSL_getNumSetpoints(1, &clk, &numSetpoints);
    for (i = 0; i < numSetpoints; i++) {
        // Determine frequency of setpoint i
        PSL_querySetpointFrequencies(1, &clk, &i, &freq);
        if ( (freq >= disiredFreq) && (freq < closestFreq ) {
            closestSetPoint = i;
            closestFreq = freq;
        }
    }
    return closestSetPoint;
}
//-----
// Function that changes setpoint to lowest frequency that
// still meets real-time requirements.
//-----
void ChangeToLowestFreq ( ) {
    float currFreq, desiredFreq;
    unsigned freqScalingLatency, voltScalingLatency;
    PSL_Setpoint currSetpoint, desiredSetpoint,
    // Determine lowest frequency that meets timing requirements
    desiredFreq = CalcLowFreq( );
    // Find nearest setpoint whose freqeuncy is greater than or
    // equal to the desired frequey
```

TABLE 53-continued

```
    desiredSetpoint = FindSetpoint(desiredFreq);
    // Is the desired setpoint equal to the current setpoint?
    PSL_getSetpoints(1, &clk, &currSetpoint);
    if ( currSetpoint == desiredSetpoint) {
        // nothing to change
        return;
    }
    // Determine the latencies involved when scaling from the current
    // setpoint to the new setpoint
    PSL_querySetpointTransitions(1,
                                  &clk,
                                  &currSetpoint,
                                  &desiredSetpoint,
                                  &freqScalingLatency,
                                  &voltScalingLatency);
    // Determine if real-time requirements are still met
    // when latencies are considered
    if ( !CanScale(freqScalingLatency + voltScalingLatency) ) {
        return;
    }
    // Change setpoint
    status = PSL_changeSetpoints(1,
                                  &clk,
                                  &desiredSetpoint,
                                  TRUE, // change voltage also
                                  FALSE,
                                  NULL, NULL);
    if (status != PSL_OK) {
        // handle error
        ..
        return;
    }
}
```

While the invention has been described with reference to illustrative embodiments, this description should not be construed in a limiting sense. Various other embodiments of the invention will be apparent to persons skilled in the art upon reference to this description. For example, other power events may be included in embodiments. Such power events could include notification of power supply changes such as AC/DC transition when the source of the system power is changed, battery power is below a given threshold or is critically low, or power failure, notification of operating system power state changes when there are transitions in the OS power state and responsiveness, or application-defined power events, e.g., an application signaling that a particular subsystem is powered up or down. This later type of power event would require that a power management system permit an application developer to configure, register, process, and optionally unregister application specific power events. Also, in the method for developing a power management strategy, additional data regarding system activities that influence power consumption may be provided to contribute to the analysis and tuning. For example, using internal memory rather than external memory can save power. Similarly, fetching instructions or data from a cache is more power efficient than using external memory. Data regarding the number of external memory accesses and the number of cache hits/misses during execution may be provided, at the level of granularity of the power measurements (task, function, or single range of execution). This data could then be used to derive changes to the application to further reduce power consumption. It is therefore contemplated that the appended claims will cover any such modifications of the embodiments as fall within the true scope and spirit of the invention.

What is claimed is:

1. A method for managing power consumption in a digital system comprising the steps of:
   registering a plurality of clients for notification of power events;
   receiving a request for a power event from a first client;
   notifying each of the registered clients of the power event before the power event occurs if the registered client requested to be notified before the occurrence of the power event; and
   causing the power event to occur;
   notifying each of the registered clients after the power event occurs that the power event has occurred if the registered client requested to be notified after the occurrence of the power event.

2. The method of claim 1 further comprising the step of unregistering a client of the plurality of clients when the client no longer wants notification of power events.

3. The method of claim 1 wherein:
   the step of receiving a request for a power event from a first client includes further receiving a notification timeout period;
   receiving a response from at least a second client that the second client is not ready for the power event to occur;
   causing the power event to occur after the second client indicates that the second client is ready for the power event to occur; and
   wherein if the second client does not indicate that the second client is ready for the power event to occur within the notification timeout period, the notifying the first client is that the timeout period has elapsed.

4. The method of claim 1 wherein:
   said step of registering a plurality of clients for notification of power events includes registering an indication of voltage/frequency setpoints supported by the client;
   storing configuration data indicative of valid set points for each registered client;
   the requested power event comprises a setpoint change; and
   the method further comprises the step of verifying that each of the registered clients can operate at a setpoint requested by the first client by reference to said stored configuration data; and
   the steps of notifying the registered clients and causing the power event to occur are executed only if all registered clients are verified to operate at the requested setpoint.

5. The method of claim 1 wherein
   the step of registering further comprises each client of the plurality of clients registering for notification of only the power events for which the client desires notification; and
   the step of notifying further comprises notifying each of the registered clients of the power event if the registered client registered for notification of the requested power event.

6. A digital system in which power consumption is dynamically managed during the operation of the digital system comprising:
   a processor;
   one or more peripheral devices coupled to the processor;
   an operating system executable by the processor;
   an application executable on the operating system; and
   a power management module incorporated in the digital system wherein the power management module is an adjunct to the operating system and provides power management functionality for the digital system, said power management functionality including
      registering a plurality of clients for notification of power events;
      receiving a request for a power event from a first client;
      notifying each of the registered clients of the power event before the power event occurs if the registered client requested to be notified before the occurrence of the power event; and
      causing the power event to occur;
      notifying each of the registered clients after the power event occurs that the power event has occurred if the registered client requested to be notified after the occurrence of the power event.

7. The digital system of claim 6 wherein the power management module provides one or more methods for power management selected from the group consisting of: causing a power-saving function to be called when the digital system is booted, invoking application specific sleep modes, registering of clients for notification of one or more power events and notifying the registered clients of power events for which the registered clients requested notification; and idling one or more specified clock domains.

8. A method for managing power consumption in a digital system comprising the steps of:
   registering a plurality of clients for notification of power events;
   receiving a request for a power event from a first client including receiving a notification timeout period;
   notifying each of the registered clients of the power event;
   receiving a response from at least a second client that the second client is not ready for the power event to occur;
   causing the power event to occur after the second client indicates that the second client is ready for the power event to occur; and
   wherein if the second client does not indicate that the second client is ready for the power event to occur within the notification timeout period, the notifying the first client that the timeout period has elapsed.

9. The method of claim 8 further comprising the step of unregistering a client of the plurality of clients when the client no longer wants notification of power events.

10. The method of claim 8 wherein: said step of registering a plurality of clients for notification of power events includes registering an indication of voltage/frequency setpoints supported by the client;
    storing configuration data indicative of valid set points for each registered client;
    the requested power event comprises a setpoint change; and
    the method further comprises the step of verifying that each of the registered clients can operate at a setpoint requested by the first client by reference to said stored configuration data; and
    the steps of notifying the registered clients and causing the power event to occur are executed only if all registered clients can operate at the requested setpoint.

11. The method of claim 8 wherein
    the step of registering further comprises each client of the plurality of clients registering for notification of only the power events for which the client desires notification; and
    the step of notifying further comprises notifying each of the registered clients of the power event if the registered client registered for notification of the requested power event.

12. A method for managing power consumption in a digital system comprising the steps of:
- registering a plurality of clients for notification of power events, said registering including an indication of voltage/frequency setpoints supported by the client;
- storing configuration data indicative of valid set points for each registered client;
- receiving a request for a power event from a first client;
- notifying each of the registered clients of the power event;
- the requested power event comprises a setpoint change; and
- verifying that each of the registered clients can operate at a setpoint requested by the first client by reference to said stored configuration data; and
- notifying the registered clients and causing the power event to occur only if all registered clients are verified to operate at the requested setpoint.

13. The method of claim 12 further comprising the step of unregistering a client of the plurality of clients when the client no longer wants notification of power events.

14. The method of claim 12 wherein
- the step of registering further comprises each client of the plurality of clients registering for notification of only the power events for which the client desires notification; and
- the step of notifying further comprises notifying each of the registered clients of the power event if the registered client registered for notification of the requested power event.

15. A method for managing power consumption in a digital system comprising the steps of:
- registering a plurality of clients for notification of only the power events for which the client desires notification; and
- receiving a request for a power event from a first client;
- causing the power event to occur; and
- notifying each of the registered clients of the power event if the registered client registered for notification of the requested power event.

16. The method of claim 15 further comprising the step of unregistering a client of the plurality of clients when the client no longer wants notification of power events.

17. The digital system of claim 6 wherein said power management functionality further including:
- unregistering a client of the plurality of clients when the client no longer wants notification of power events.

18. The digital system of claim 6 wherein:
- said power management functionality wherein the functionality of receiving a request for a power event from a first client includes receiving a notification timeout period;
- said power management functionality further including receiving a response from at least a second client that the second client is not ready for the power event to occur;
- said power management functionality further including causing the power event to occur after the second client indicates that the second client is ready for the power event to occur; and
- said power management functionality further including if the second client does not indicate that the second client is ready for the power event to occur within the notification timeout period, the notifying the first client that the timeout period has elapsed.

19. The digital system of claim 6 wherein:
- said power management functionality wherein said functionality of registering a plurality of clients for notification of power events includes registering an indication of voltage/frequency setpoints supported by the client;
- said power management functionality further including storing configuration data indicative of valid set points for each registered client;
- said power management functionality further including the requested power event comprises a setpoint change; and
- said power management functionality further including the method further comprises the step of verifying that each of the registered clients can operate at a setpoint requested by the first client by reference to said stored configuration data; and
- said power management functionality wherein the functionality of notifying the registered clients and causing the power event to occur are executed only if all registered clients are verified to operate at the requested setpoint.

20. The digital system of claim 6 wherein:
- said power management functionality wherein the functionality of registering further comprises each client of the plurality of clients registering for notification of only the power events for which the client desires notification; and
- said power management functionality wherein the functionality of notifying further comprises notifying each of the registered clients of the power event if the registered client registered for notification of the requested power event.

21. A digital system in which power consumption is dynamically managed during the operation of the digital system comprising:
- a processor;
- one or more peripheral devices coupled to the processor;
- an operating system executable by the processor;
- an application executable on the operating system; and
- a power management module incorporated in the digital system wherein the power management module is an adjunct to the operating system and provides power management functionality for the digital system, said power management functionality including
  - registering a plurality of clients for notification of power events including receiving a notification timeout period;
  - receiving a request for a power event from a first client;
  - notifying each of the registered clients of the power event; and
  - receiving a response from at least a second client that the second client is not ready for the power event to occur;
  - causing the power event to occur after the second client indicates that the second client is ready for the power event to occur; and
  - if the second client does not indicate that the second client is ready for the power event to occur within the notification timeout period, the notifying the first client that the timeout period has elapsed.

22. The digital system of claim 21 wherein said power management functionality further including:
- unregistering a client of the plurality of clients when the client no longer wants notification of power events.

23. The digital system of claim 21 wherein:
- said power management functionality wherein said functionality of registering a plurality of clients for notification of power events includes registering an indication of voltage/frequency setpoints supported by the client;

said power management functionality further including storing configuration data indicative of valid set points for each registered client;

said power management functionality further including the requested power event comprises a setpoint change; and said power management functionality further including the method further comprises the step of verifying that each of the registered clients can operate at a setpoint requested by the first client by reference to said stored configuration data; and said power management functionality wherein the functionality of notifying the registered clients and causing the power event to occur are executed only if all registered clients are verified to operate at the requested setpoint.

24. The digital system of claim 21 wherein:

said power management functionality wherein the functionality of registering further comprises each client of the plurality of clients registering for notification of only the power events for which the client desires notification; and said power management functionality wherein the functionality of notifying further comprises notifying each of the registered clients of the power event if the registered client registered for notification of the requested power event.

25. A digital system in which power consumption is dynamically managed during the operation of the digital system comprising:

a processor;
one or more peripheral devices coupled to the processor;
an operating system executable by the processor;
an application executable on the operating system; and
a power management module incorporated in the digital system wherein the power management module is an adjunct to the operating system and provides power management functionality for the digital system, said power management functionality including registering a plurality of clients for notification of power events, said registering including an indication of voltage/frequency setpoints supported by the client;

storing configuration data indicative of valid set points for each registered client;

receiving a request for a power event from a first client;

notifying each of the registered clients of the power event;

the requested power event comprises a setpoint change; and verifying that each of the registered clients can operate at a setpoint requested by the first client by reference to said stored configuration data; and notifying the registered clients and causing the power event to occur only if all registered clients are verified to operate at the requested setpoint.

26. The digital system of claim 25 wherein said power management functionality further including:

unregistering a client of the plurality of clients when the client no longer wants notification of power events.

27. The digital system of claim 25 wherein:

said power management functionality wherein the functionality of registering further comprises each client of the plurality of clients registering for notification of only the power events for which the client desires notification; and said power management functionality wherein the functionality of notifying further comprises notifying each of the registered clients of the power event if the registered client registered for notification of the requested power event.

28. A digital system in which power consumption is dynamically managed during the operation of the digital system comprising:

a processor;
one or more peripheral devices coupled to the processor;
an operating system executable by the processor;
an application executable on the operating system; and
a power management module incorporated in the digital system wherein the power management module is an adjunct to the operating system and provides power management functionality for the digital system, said power management functionality including registering a plurality of clients for notification of only the power events for which the client desires notification; and receiving a request for a power event from a first client;
causing the power event to occur; and
notifying each of the registered clients of the power event if the registered client registered for notification of the requested power event.

29. The digital system of claim 28 wherein said power management functionality further including:

unregistering a client of the plurality of clients when the client no longer wants notification of power events.

* * * * *